United States Patent
Dabeer et al.

(10) Patent No.: US 10,201,016 B2
(45) Date of Patent: Feb. 5, 2019

(54) TECHNIQUES FOR CELL ACCESS USING AN UNLICENSED RADIO FREQUENCY SPECTRUM BAND

(71) Applicant: QUALCOMM Incorporated, San Diego, CA (US)

(72) Inventors: Onkar Jayant Dabeer, San Diego, CA (US); Aleksandar Damnjanovic, Del Mar, CA (US); Madhavan Srinivasan Vajapeyam, San Diego, CA (US); Xiaoxia Zhang, San Diego, CA (US); Shimman Arvind Patel, San Diego, CA (US); Wanshi Chen, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 15/044,717

(22) Filed: Feb. 16, 2016

(65) Prior Publication Data
US 2016/0242213 A1    Aug. 18, 2016

Related U.S. Application Data

(60) Provisional application No. 62/117,554, filed on Feb. 18, 2015.

(51) Int. Cl.
*H04W 74/08* (2009.01)
*H04W 16/14* (2009.01)

(52) U.S. Cl.
CPC ........ *H04W 74/0833* (2013.01); *H04W 16/14* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2008/0049708 A1* | 2/2008 | Khan | H04B 1/713 370/343 |
| 2008/0101305 A1* | 5/2008 | Cave | H04W 52/16 370/336 |

(Continued)

FOREIGN PATENT DOCUMENTS

WO    WO-2013126858 A1    8/2013

OTHER PUBLICATIONS

ISA/EP, International Search Report and Written Opinion of the International Searching Authority, PCT App. No. PCT/US2016/018205, dated Jul. 18, 2016, European Patent Office, Rijswijk, NL, 22 pgs.

(Continued)

*Primary Examiner* — Jeffrey M Rutkowski
*Assistant Examiner* — Andre G Tacdiran
(74) *Attorney, Agent, or Firm* — Liem T. Do

(57) ABSTRACT

Techniques are described for wireless communication. One method includes winning a contention for access to an unlicensed radio frequency spectrum band, transmitting a request message upon winning the contention for access to the unlicensed radio frequency spectrum band, and receiving a response message over the unlicensed radio frequency spectrum band. The request message is transmitted by a user equipment (UE) on an enhanced physical random access channel (ePRACH) or shortened ePRACH (SePRACH), to access a cell that operates in the unlicensed radio frequency spectrum band. The response message is received in response to transmitting the request message, and the request message may be transmitted irrespective of whether a base station has gained access to the unlicensed radio frequency spectrum band.

20 Claims, 20 Drawing Sheets

(56) References Cited

U.S. PATENT DOCUMENTS

| | | | | |
|---|---|---|---|---|
| 2010/0260080 | A1* | 10/2010 | Hao | H04L 5/0053 370/280 |
| 2011/0243261 | A1* | 10/2011 | Bienas | H04W 72/1215 375/260 |
| 2012/0076010 | A1* | 3/2012 | Chu | H04W 28/06 370/252 |
| 2012/0155279 | A1* | 6/2012 | Ho | H04L 47/522 370/241 |
| 2012/0250631 | A1* | 10/2012 | Hakola | H04L 5/001 370/329 |
| 2012/0258750 | A1* | 10/2012 | Kim | H04W 48/20 455/509 |
| 2013/0215823 | A1* | 8/2013 | Shin | H04L 5/001 370/328 |
| 2013/0308568 | A1* | 11/2013 | Chen | H04W 72/0406 370/329 |
| 2014/0044105 | A1* | 2/2014 | Bontu | H04L 5/001 370/336 |
| 2014/0106749 | A1* | 4/2014 | Wegmann | H04W 48/18 455/436 |
| 2014/0204854 | A1* | 7/2014 | Freda | H04L 1/18 370/329 |
| 2015/0029905 | A1* | 1/2015 | Yi | H04L 1/0026 370/277 |
| 2015/0057011 | A1* | 2/2015 | Di Girolamo | H04W 74/0808 455/454 |
| 2015/0131550 | A1* | 5/2015 | Guo | H04W 72/02 370/329 |
| 2015/0173105 | A1* | 6/2015 | Bergstrom | H04W 74/006 370/329 |
| 2015/0319779 | A1* | 11/2015 | Li | H04L 27/2613 370/329 |
| 2016/0029331 | A1* | 1/2016 | Seo | H04W 56/002 370/350 |
| 2016/0095009 | A1* | 3/2016 | Ling | H04W 16/14 370/329 |
| 2017/0118748 | A1* | 4/2017 | Kalhan | H04W 76/14 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 v12.4.0 (Dec. 2014) Technical Specification, Dec. 2014, 251 pgs., 3rd Generation Partnership Project.

Ericsson, "Details of Listen-Before-Talk for LAA," 3GPP TSG RAN WG1 Meeting #79, R1-145193, San Francisco, USA, Nov. 17-21, 2014, 7 pgs., XP_50895524A, 3rd Generation Partnership Project.

ISA/EPO, Partial International Search Report of the International Searching Authority, PCT App. No. PCT/US2016/018205, dated May 11, 2016, European Patent Office, Rijswijk, NL, 8 pgs.

Samsung, "Discussion on UL Transmission for LAA," 3GPP TSG RAN WG1 #80, R1-150368, Athens, Greece, Feb. 9-13, 2015, 7 pg., XP_50933577A, 3rd Generation Partnership Project.

* cited by examiner

TECHNIQUES FOR CELL ACCESS USING AN UNLICENSED RADIO FREQUENCY SPECTRUM BAND

CROSS REFERENCES

The present application for patent claims priority to U.S. Provisional Patent Application No. 62/117,554 by Dabeer et al., entitled "Techniques for Cell Access Using an Unlicensed Radio Frequency Spectrum Band," filed Feb. 18, 2015, assigned to the assignee hereof, and expressly incorporated by reference herein.

BACKGROUND

Field of the Disclosure

The present disclosure, for example, relates to wireless communication systems, and more particularly to techniques for accessing a cell using an unlicensed radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications with a UE over an unlicensed radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band can also provide wireless access for a venue, such as a stadium or hotel, that may not have access to a licensed radio frequency spectrum band.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is unavailable, a CCA procedure may be performed for the channel again at a later time.

Under some conditions (e.g., when a cell operating in a licensed radio frequency spectrum band is not available), a UE may access a cell operating in an unlicensed radio frequency spectrum band as the UE's primary cell. One way to access a cell operating in an unlicensed radio frequency spectrum band is to use a random access procedure and radio resource control (RRC) connection setup procedure similarly as used for Long Term Evolution (LTE) communications or LTE-Advanced (LTE-A) communications. However, when operating using an unlicensed radio frequency spectrum band, such a random access procedure may require the performance of one or more CCA procedures by both a base station and a UE to win contention for access to the unlicensed radio frequency spectrum band. Due to the uncertainty of contention for access to the unlicensed radio frequency spectrum band, access procedures requiring fewer contentions for channel access may be desirable.

SUMMARY

The present disclosure, for example, relates to one or more techniques for accessing a cell using an unlicensed radio frequency spectrum band which may reduce the number of channel contentions required to complete the access procedure. In some examples, a user equipment (UE) may transmit a random access request in the absence of a base station winning channel access in a contention-based channel access procedure. The base station may process the access request and transmit a response message after winning channel access in a subsequent contention-based channel access procedure. The UE may transmit the access request in one or more identified subframes of a listen before talk (LBT) radio frame, and within one or more identified symbols of the identified subframes. A base station that has not won channel access may monitor the identified subframes of the identified LBT radio frames and thus the Radio Resource Control (RRC) connection setup procedure may be more efficient.

In some examples, a UE may identify a subset of symbols within a subframe of an identified LBT radio frame for performing a contention-based access procedure, such as a clear channel assessment (CCA) procedure, for gaining access to the unlicensed radio frequency spectrum band. The subset of symbols may be identified based at least in part on, for example, hardware or software delays for detection of a channel usage beacon signal (CUBS) that may be transmitted in a previous subframe. The UE may perform the contention-based channel access procedure and, if channel access is won and a CUBS is not detected, the UE may transmit a request message using the identified symbols for the request message.

In certain examples, a base station may configure random access resources using one or more specified subframes of an enhanced physical uplink control channel (ePUCCH) that may then be monitored for access requests from UEs. In other examples, a base station may attempt to transmit enhanced physical frame format indicator channel (ePFICH) transmissions periodically to start LBT radio frames, and a UE may transmit an access request using resources identified for the LBT radio frame(s).

A method of wireless communication at a wireless device is described. The method may include determining a subframe within a radio frame available for transmission of a request message for access to an unlicensed radio frequency spectrum band, identifying a first subset of symbols within the subframe for performing a contention-based access procedure for gaining access to the unlicensed radio frequency spectrum band, and a second subset of symbols within the subframe for transmission of the request message for access to the unlicensed radio frequency spectrum band, performing the contention-based access procedure during the first subset of symbols, and transmitting the request message during the second subset of symbols based on an outcome of the contention-based access procedure.

An apparatus for wireless communication at a wireless device is described. The apparatus may include means for determining a subframe within a radio frame available for transmission of a request message for access to an unlicensed radio frequency spectrum band, means for identifying a first subset of symbols within the subframe for performing a contention-based access procedure for gaining access to the unlicensed radio frequency spectrum band, and a second subset of symbols within the subframe for transmission of the request message for access to the unlicensed radio frequency spectrum band, means for performing the contention-based access procedure during the first subset of symbols, and means for transmitting the request message during the second subset of symbols based on an outcome of the contention-based access procedure.

A further apparatus for wireless communication at a wireless device is described. The apparatus may include a processor and memory coupled with the processor, wherein the processor is configured to determine a subframe within a radio frame available for transmission of a request message for access to an unlicensed radio frequency spectrum band, identify a first subset of symbols within the subframe for performing a contention-based access procedure for gaining access to the unlicensed radio frequency spectrum band, and a second subset of symbols within the subframe for transmission of the request message for access to the unlicensed radio frequency spectrum band, perform the contention-based access procedure during the first subset of symbols, and transmit the request message during the second subset of symbols based on an outcome of the contention-based access procedure.

A non-transitory computer-readable medium for storing instructions executable by a processor is described. The computer-readable medium may include instructions to determine a subframe within a radio frame available for transmission of a request message for access to an unlicensed radio frequency spectrum band, identify a first subset of symbols within the subframe for performing a contention-based access procedure for gaining access to the unlicensed radio frequency spectrum band, and a second subset of symbols within the subframe for transmission of the request message for access to the unlicensed radio frequency spectrum band, perform the contention-based access procedure during the first subset of symbols, and transmit the request message during the second subset of symbols based on an outcome of the contention-based access procedure.

Some examples of the method, apparatuses, or non-transitory computer-readable medium described above may further include transmitting the request message on an enhanced physical random access channel (ePRACH) over the unlicensed radio frequency spectrum band, to access a cell that operates in the unlicensed radio frequency spectrum band. Additionally or alternatively, in some examples the first subset of symbols is identified based at least in part on a hardware delay or software delay for detecting a channel occupancy signal from another node and a subframe boundary of the subframe within the radio frame.

In some examples of the method, apparatuses, or non-transitory computer-readable medium described above, the second subset of symbols is identified based at least in part on the first subset of symbols, an identified symbol within the subframe for transmission of the channel occupancy signal from another node, or a transmit-to-receive switching delay. Additionally or alternatively, in some examples the request message comprises a first symbol and a second symbol, the first symbol including a demodulation reference signal (DMRS) and the second symbol comprising data associated with the request message.

In some examples of the method, apparatuses, or non-transitory computer-readable medium described above, the request message is multiplexed with one or more other nodes. Additionally or alternatively, in some examples the request message is multiplexed through a DMRS shift for the first symbol and data interlacing for the second symbol.

In some examples of the method, apparatuses, or non-transitory computer-readable medium described above, the transmission of the request message is unaligned with a subframe boundary of the subframe and aligned with a symbol boundary. Additionally or alternatively, in some examples a channel occupancy signal is not transmitted prior to transmitting the request message.

Some examples of the method, apparatuses, or non-transitory computer-readable medium described above may further include receiving, in a system information block, an indication of at least one of the subframe, the first subset of symbols, or the second subset of symbols. Additionally or alternatively, in some examples determining the subframe within the radio frame available for transmission of the request message comprises determining that the unlicensed radio frequency spectrum band is unoccupied by another node during the subframe.

Some examples of the method, apparatuses, or non-transitory computer-readable medium described above may further include determining, while performing the contention-based access procedure during the first subset of symbols, whether another node has indicated occupancy of the unlicensed radio frequency spectrum band, and transmitting the request message during the second subset of symbols based on an outcome of the contention-based access procedure and the determination of whether another node has indicated occupancy of the unlicensed radio frequency spectrum band. Additionally or alternatively, some examples may include determining that one or more other resources are available for transmission of the request message, and selecting one of the available resources for transmission of the request message based at least in part on a prioritization of available resources.

In some examples of the method, apparatuses, or non-transitory computer-readable medium described above, the prioritization of available resources for transmission of the request message is based at least in part on a next available resource for transmission of the request message. Additionally or alternatively, in some examples the prioritization of available resources for transmission of the request message is based on a prioritization of resources received in a system information block.

In some examples of the method, apparatuses, or non-transitory computer-readable medium described above, the prioritization of available resources for transmission of the request message is based on a biased random selection of available resources. Additionally or alternatively, in some examples the one or more other resources are available for transmission of the request message comprise a dedicated ePRACH resource or a CCA exempt transmission. In some examples of the method, apparatuses, or non-transitory computer-readable medium described above, the request message is an unscheduled request message.

A method of wireless communication at a wireless device is described. The method may include identifying one or more subframes within one or more radio frames for reception of a request message for access to an unlicensed radio frequency spectrum band by a UE, and identifying a subset of symbols within the identified one or more subframes for reception of the request message for access to the unlicensed radio frequency spectrum band.

An apparatus for wireless communication at a wireless device is described. The apparatus may include means for identifying one or more subframes within one or more radio frames for reception of a request message for access to an unlicensed radio frequency spectrum band by a UE, and means for identifying a subset of symbols within the identified one or more subframes for reception of the request message for access to the unlicensed radio frequency spectrum band.

A further apparatus for wireless communication at a wireless device is described. The apparatus may include a processor and memory coupled with the processor, wherein the processor is configured to identify one or more subframes within one or more radio frames for reception of a request message for access to an unlicensed radio frequency spectrum band by a UE, and identify a subset of symbols within the identified one or more subframes for reception of the request message for access to the unlicensed radio frequency spectrum band.

A non-transitory computer-readable medium for storing instructions executable by a processor is described. The computer-readable medium may include instructions to identify one or more subframes within one or more radio frames for reception of a request message for access to an unlicensed radio frequency spectrum band by a UE, and identify a subset of symbols within the identified one or more subframes for reception of the request message for access to the unlicensed radio frequency spectrum band.

Some examples of the method, apparatuses, or non-transitory computer-readable medium described above may further include transmitting an indication of the identified one or more subframes and the subset of symbols to the UE. Additionally or alternatively, in some examples the indication is transmitted in a system information block (SIB).

In some examples of the method, apparatuses, or non-transitory computer-readable medium described above, the indication further comprises a further identification of one or more other resources available for transmission of the request message and a prioritization of available resources. Additionally or alternatively, in some examples the prioritization of available resources comprises a parameter to control a load of request messages on one or more of the available resources for transmission of the request message.

Some examples of the method, apparatuses, or non-transitory computer-readable medium described above may further include monitoring the subset of symbols for a request message from the UE to access the unlicensed radio frequency spectrum band. Additionally or alternatively, in some examples the subset of symbols is identified based at least in part on a time for transmission of a channel occupancy signal from another node, or a transmit-to-receive switching delay.

In some examples of the method, apparatuses, or non-transitory computer-readable medium described above, the request message comprises a first symbol and a second symbol, the first symbol including a DMRS and the second symbol comprising data associated with the request message.

A method of wireless communication at a wireless device is described. The method may include identifying periodic subframes that are available for transmission of a request message for access to an unlicensed radio frequency spectrum band from a UE to a base station, performing, by the UE, a contention-based access procedure during a first subframe of the identified periodic subframes, the contention-based access procedure performed irrespective of whether the base station has access to the unlicensed radio frequency spectrum band, and transmitting the request message during the first subframe based on an outcome of the contention-based access procedure.

An apparatus for wireless communication at a wireless device is described. The apparatus may include means for identifying periodic subframes that are available for transmission of a request message for access to an unlicensed radio frequency spectrum band from a UE to a base station, means for performing, by the UE, a contention-based access procedure during a first subframe of the identified periodic subframes, the contention-based access procedure performed irrespective of whether the base station has access to the unlicensed radio frequency spectrum band, and means for transmitting the request message during the first subframe based on an outcome of the contention-based access procedure.

A further apparatus for wireless communication at a wireless device is described. The apparatus may include a processor and memory coupled with the processor, wherein the processor is configured to identify periodic subframes that are available for transmission of a request message for access to an unlicensed radio frequency spectrum band from a UE to a base station, perform, by the UE, a contention-based access procedure during a first subframe of the identified periodic subframes, the contention-based access procedure performed irrespective of whether the base station has access to the unlicensed radio frequency spectrum band, and transmit the request message during the first subframe based on an outcome of the contention-based access procedure.

A non-transitory computer-readable medium for storing instructions executable by a processor is described. The computer-readable medium may include instructions to identify periodic subframes that are available for transmission of a request message for access to an unlicensed radio frequency spectrum band from a UE to a base station, perform, by the UE, a contention-based access procedure during a first subframe of the identified periodic subframes, the contention-based access procedure performed irrespective of whether the base station has access to the unlicensed radio frequency spectrum band, and transmit the request message during the first subframe based on an outcome of the contention-based access procedure.

In some examples of the method, apparatuses, or non-transitory computer-readable medium described above, the identifying periodic subframes comprises receiving, in a system information block, an indication of the periodic subframes that are available for transmission of the request message. Additionally or alternatively, in some examples the identifying periodic subframes further comprises determining that the unlicensed radio frequency spectrum band is unoccupied by another node during one or more of the identified periodic subframes.

Some examples of the method, apparatuses, or non-transitory computer-readable medium described above, one or more times for performance of the contention-based access procedure may be determined based at least in part on the identified periodic subframes.

A method of wireless communication at a wireless device is described. The method may include receiving one or more transmissions at a UE from a base station identifying a boundary for an LBT frame, determining ePRACH resources within the LBT frame, performing, by the UE, a contention-based access procedure during the LBT frame, and transmitting a request message for access to an unlicensed radio frequency spectrum band from the UE to the base station based on an outcome of the contention-based access procedure.

An apparatus for wireless communication at a wireless device is described. The apparatus may include means for receiving one or more transmissions at a UE from a base station identifying a boundary for an LBT frame, means for determining ePRACH resources within the LBT frame, means for performing, by the UE, a contention-based access procedure during the LBT frame, and means for transmitting a request message for access to an unlicensed radio frequency spectrum band from the UE to the base station based on an outcome of the contention-based access procedure.

A further apparatus for wireless communication at a wireless device is described. The apparatus may include a processor and memory coupled with the processor, wherein the processor is configured to receive one or more transmissions at a UE from a base station identifying a boundary for an LBT frame, determine ePRACH resources within the LBT frame, perform, by the UE, a contention-based access procedure during the LBT frame, and transmit a request message for access to an unlicensed radio frequency spectrum band from the UE to the base station based on an outcome of the contention-based access procedure.

A non-transitory computer-readable medium for storing instructions executable by a processor is described. The computer-readable medium may include instructions to receive one or more transmissions at a UE from a base station identifying a boundary for an LBT frame, determine ePRACH resources within the LBT talk frame, perform, by the UE, a contention-based access procedure during the LBT frame, and transmit a request message for access to an unlicensed radio frequency spectrum band from the UE to the base station based on an outcome of the contention-based access procedure.

In some examples of the method, apparatuses, or non-transitory computer-readable medium described above, the one or more transmissions comprise one or more enhanced system information block (eSIB) transmissions. Additionally or alternatively, in some examples the ePRACH resources are configured in the eSIB transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
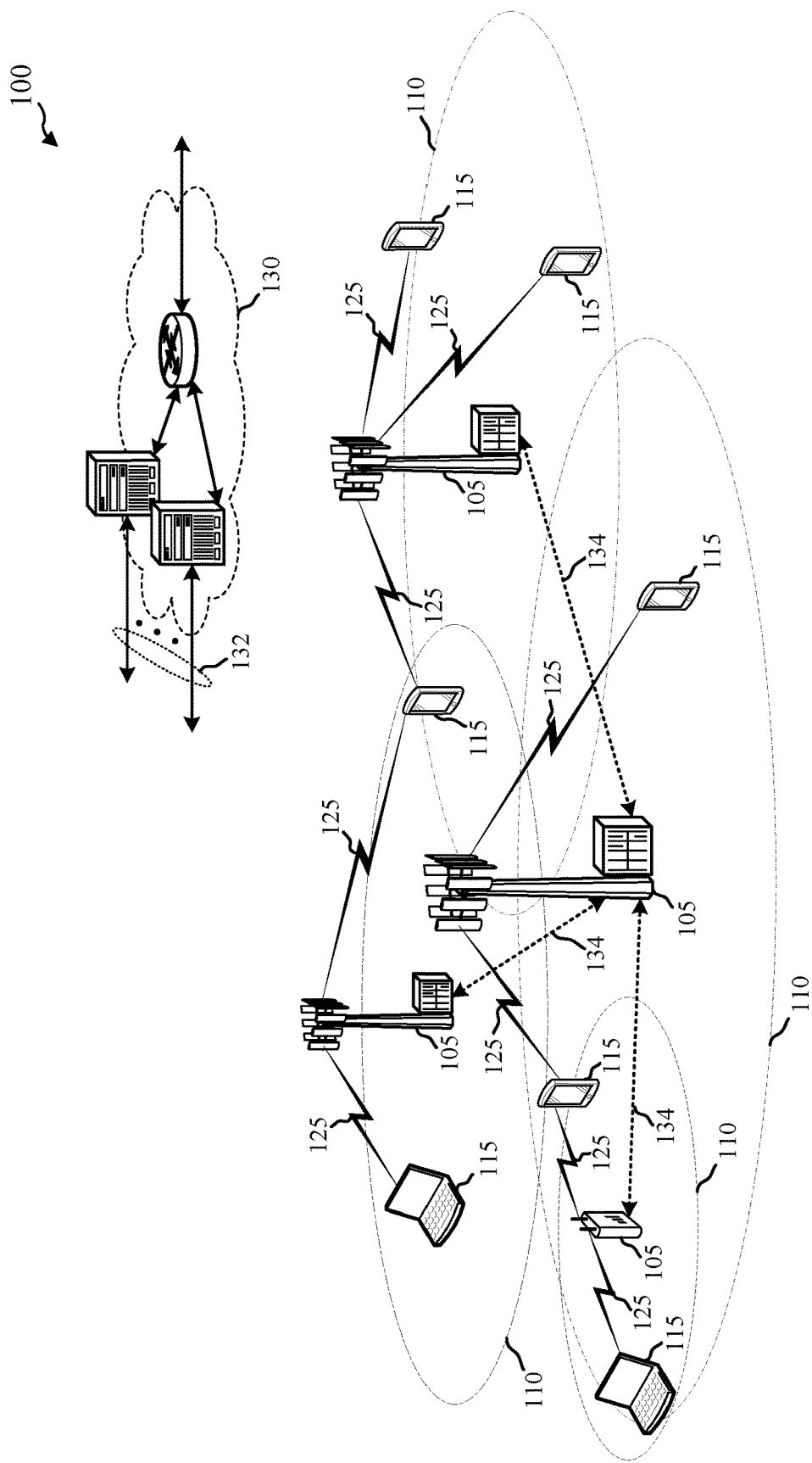
FIG. 1 illustrates an example of a wireless communication system, in accordance with various aspects of the disclosure.

Techniques are described in which an unlicensed radio frequency spectrum band is used for at least a portion of communications over a wireless communication system. In some examples, the unlicensed radio frequency spectrum band may be used for Long Term Evolution (LTE) or LTE-Advanced (LTE-A) communications. The unlicensed radio frequency spectrum band may be used in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. An unlicensed radio frequency spectrum band can also provide wireless access for a venue, such as a stadium or hotel, that may not have access to a licensed radio frequency spectrum band. As noted above, before communicating over the unlicensed radio frequency spectrum band, devices may perform a listen before talk (LBT) procedure to gain access to the radio frequency spectrum band. Such an LBT procedure may include performing a clear channel assessment (CCA) procedure (or extended CCA (eCCA) procedure) to determine whether a channel of the unlicensed radio frequency spectrum band is available. When it is determined that the channel of the unlicensed radio frequency spectrum band is available, a channel usage beacon signal (CUBS) may be transmitted to reserve the channel. When it is determined that a channel is not available, a CCA procedure (or eCCA procedure) may be performed for the channel again at a later time.

In some situations, a user equipment (UE) may access a cell exclusively using an unlicensed radio frequency spectrum band, which may be referred to as stand-alone operation. In such situations, when a UE seeks to access the cell and does not otherwise have an established Radio Resource Control (RRC) connection with the cell, the UE may perform a random access procedure similarly as used for LTE/LTE-A communications. However, as mentioned above, when operating using an unlicensed radio frequency spectrum band, such a random access procedure may require the performance of one or more CCA procedures by both a base station and a UE to win contention for access to the unlicensed radio frequency spectrum band. In some deployments, access requests may be transmitted during periodic CCA-exempt transmissions (CETs). However, such CET transmissions are available relatively infrequently (every 80 ms in some examples). Further, in some deployments a base station may configure resources for access requests using an enhanced physical random access channel (ePRACH) available during a first uplink (UL) subframe of an LBT frame. However, such access requests require that both the base station and UE have cleared CCA and due to the uncertainty of contention for access to the unlicensed radio frequency spectrum band, such access procedures may result in a relatively prolonged period before a UE is able to transmit an access request. Furthermore, in cases where the base station does not have data to transmit, the base station may not attempt a channel contention procedure, which may further contribute to prolonged periods where a UE may not be able to transmit an access request.

The present disclosure provides various techniques for increasing opportunities for a UE to transmit an access request to establish an RRC connection with a base station. In some examples, a shortened ePRACH (SePRACH) technique may be used for an access request to establish a RRC connection. Such an SePRACH may be subject to CCA only at the UE, may provide more persistent CCA opportunities to the UE, and may reduce potential collisions between transmissions of a UE and a base station. In some examples, SePRACH opportunities for transmitting an access request are provided in addition to CET opportunities and other ePRACH opportunities, and a UE may prioritize the resources for attempting transmission of access requests based on one or more configurable criteria. In some examples, disclosed techniques may reduce the number of channel contentions required to complete the access procedure, such as through transmission of a random access request in the absence of a base station winning channel access. The UE may transmit the access request in one or more identified subframes of an LBT radio frame, and within one or more identified symbols of the identified subframes. A base station that has not won channel access may monitor the identified subframes of the identified LBT radio frames and thus the RRC connection setup procedure may be more efficient.

In some examples, a UE may identify a subset of symbols within a subframe of an identified LBT radio frame for performing a contention-based access procedure, such as a CCA procedure, for gaining access to the unlicensed radio frequency spectrum band and using SePRACH resources. The subset of symbols may be identified based at least in part on, for example, hardware or software delays for detection of a CUBS that may be transmitted in a previous subframe. The UE may perform the contention-based channel access procedure and, if channel access is won and a CUBS is not detected, the UE may transmit a request message using the identified symbols for the request message. In some examples, SePRACH resources may include two orthogonal frequency division multiplexing (OFDM) symbols, one for a demodulation reference signal (DMRS) and one of data. In other examples, SePRACH resources may be as long as five OFDM symbols. SePRACH transmissions may be configured to be offset from the start of a LBT subframe in order to allow for detection of a downlink CUBS (D-CUBS) from a base station, in order to avoid collision with base station transmissions. The SePRACH transmissions also may be configured to ends early enough to allow transition time for an uplink-downlink (UL-DL) switch at the UE and to avoid interference with potential D-CUBS transmissions.

In certain examples, a base station may configure random access resources using one or more specified subframes of an enhanced physical uplink control channel (ePUCCH) that may then be monitored for access requests from UEs. In other examples, a base station may attempt to transmit enhanced physical frame format indicator channel (ePFICH) transmissions periodically, irrespective of whether the base station has data to transmit, in order to start LBT radio frames, and a UE may transmit an access request using resources identified for the LBT radio frame(s).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the techniques described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an evolved NodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3rd Generation Partnership Project (3GPP) term that can be used to describe a base station 105, a carrier or component carrier associated with a base station 105, or a coverage area 110 (e.g., sector, etc.) of a carrier or base station 105, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the RRC protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, uplink transmissions may include transmissions of uplink control information, which uplink control information may be transmitted over an uplink control channel (e.g., a physical uplink control channel (PUCCH) or ePUCCH). The uplink control information may include, for example, acknowledgements or non-acknowledgements of downlink transmissions, or channel state information. UL transmissions may also include transmissions of data, which data may be transmitted over a physical uplink shared channel (PUSCH) or enhanced PUSCH (ePUSCH). UL transmissions may also include the transmission of a sounding reference signal (SRS) or enhanced SRS (eSRS), a physical random access channel (PRACH) or ePRACH (e.g., in a dual connectivity mode or the standalone mode described with reference to FIG. 2), or a scheduling request (SR) or enhanced SR (eSR) (e.g., in the standalone mode described with reference to FIG. 2). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some embodiments of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). Upon winning a contention for access to the unlicensed radio frequency spectrum band, a transmitting apparatus (e.g., a base station 105 or UE 115) may transmit one or more CUBS over the unlicensed radio frequency spectrum band. The CUBS may serve to reserve the unlicensed radio frequency spectrum by providing a detectable energy on the unlicensed radio frequency spectrum band. The CUBS may also serve to identify the transmitting apparatus or serve to synchronize the transmitting apparatus and a receiving apparatus.

A UE 115 may initiate a random access procedure to access, via a base station 105, a cell of the wireless communication system 100. A cell may be accessed as a primary cell (or primary serving cell) or as a secondary cell (or secondary serving cell). A cell may also be accessed over a licensed radio frequency spectrum band or an unlicensed radio frequency spectrum band, depending on the cell's configuration.

Figure 2:
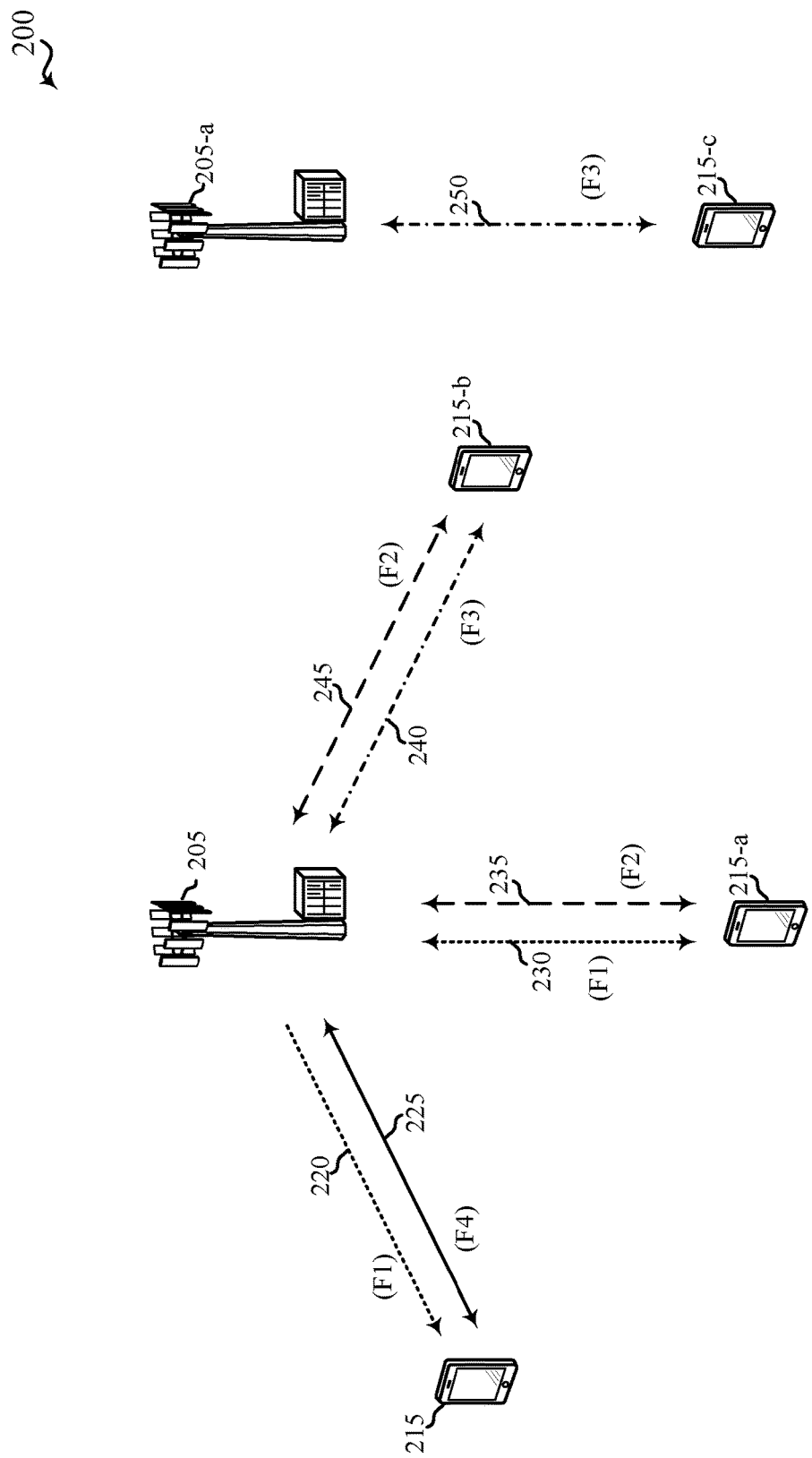
FIG. 2 shows a wireless communication system in which Long Term Evolution (LTE) or LTE-Advanced (LTE-A) may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit orthogonal frequency-division multiple access (OFDMA) waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive single carrier frequency division multiple access (SC-FDMA) waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved frequency division multiple access (FDMA) waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum which may need to relieve some traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the unlicensed radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid FDD-TDD carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., a CCA procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
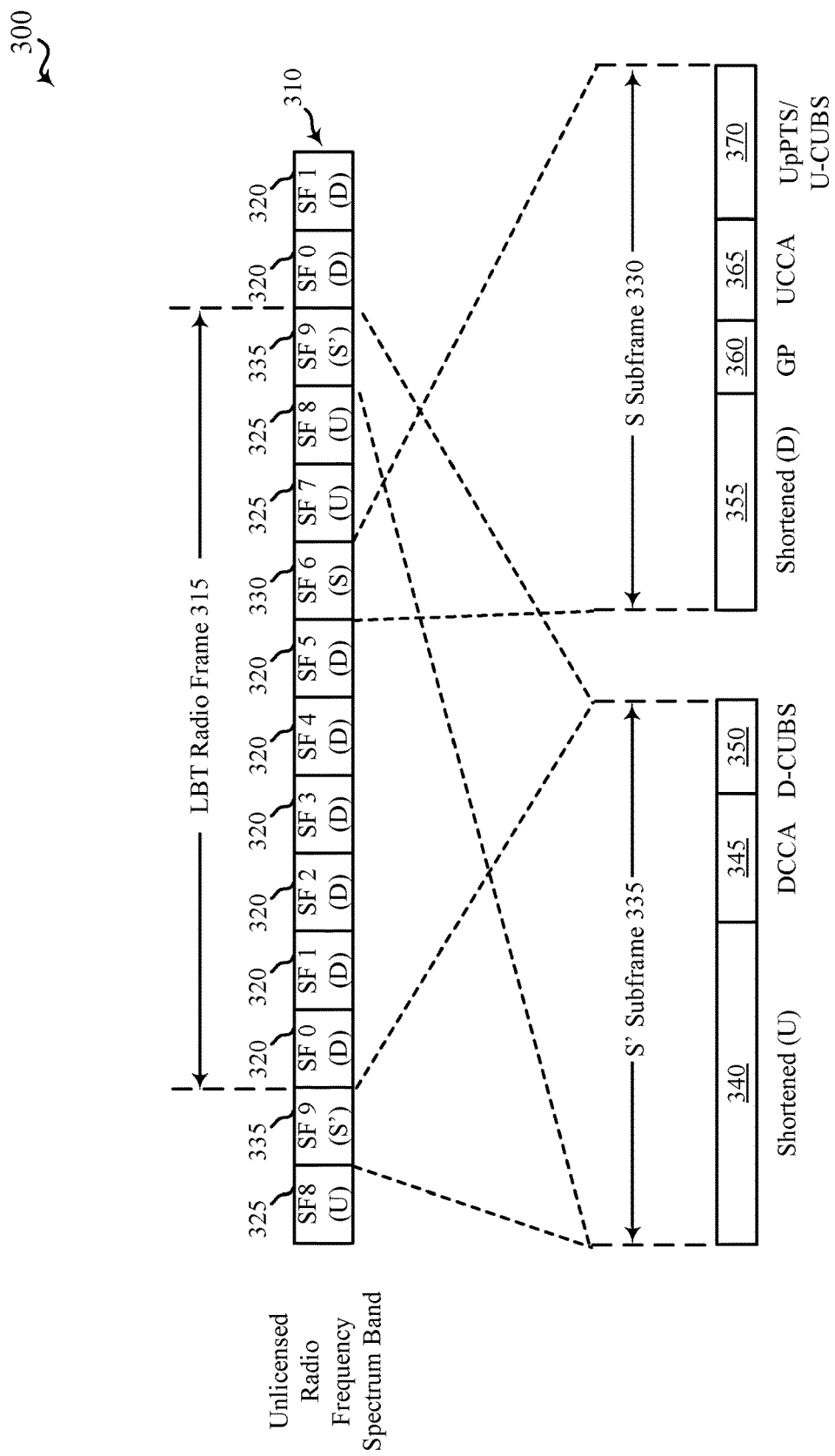
FIG. 3 shows an example of a wireless communication over an unlicensed radio frequency spectrum band, in accordance with various aspects of the present disclosure.

FIG. 3 shows an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320.

During the S' subframe 335, a downlink CCA (DCCA) procedure 345 may be performed by one or more base stations, such as one or more of the base stations 105, 205, or 205-*a* described with reference to FIG. 1 or 2, to reserve, for a period of time, a channel of the unlicensed radio frequency spectrum band over which the wireless communication 310 occurs. Following a successful DCCA procedure 345 by a base station, the base station may transmit a CUBS (e.g., D-CUBS 350) to provide an indication to other base stations or apparatuses (e.g., UEs, Wi-Fi access points, etc.) that the base station has reserved the channel. In some examples, the D-CUBS 350 may be transmitted using a plurality of interleaved resource blocks. Transmitting a D-CUBS 350 in this manner may enable the D-CUBS 350 to occupy at least a certain percentage of the available frequency bandwidth of the unlicensed radio frequency spectrum band and satisfy one or more regulatory requirements (e.g., a requirement that transmissions over the unlicensed radio frequency spectrum band occupy at least 80% of the available frequency bandwidth). The D-CUBS 350 may in some examples take a form similar to that of an LTE/LTE-A common reference signal (CRS) or a channel state information reference signal (CSI-RS). If the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the unlicensed radio frequency spectrum band to transmit the D-CUBS 350.

During the S subframe 330, an uplink CCA (UCCA) procedure 365 may be performed by one or more UEs, such as one or more of the UEs 115, 215, 215-*a*, 215-*b*, or 215-*c* described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the unlicensed radio frequency spectrum band and satisfy one or more regulatory requirements (e.g., the requirement that transmissions over the unlicensed radio frequency spectrum band occupy at least 80% of the available frequency bandwidth). The U-CUBS 370 may in some examples take a form similar to that of an LTE/LTE-A CRS or CSI-RS. If the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the unlicensed radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an eCCA procedure. The eCCA procedure may include a random number of CCA procedures, and in some examples may include a plurality of CCA procedures. As mentioned above, certain deployments may allow for periodic CCA-Exempt Transmissions (CETs) of synchronous operators in an unlicensed radio frequency spectrum band. A CET may be made without winning a contention for access to the unlicensed radio frequency spectrum band and, in some examples, without performing a CCA (e.g., a DCCA or a UCCA). Instead, an operator may be exempted from performing a CCA for the purpose of transmitting a CET.

In certain examples, CETs may be made, for example, once every eighty milliseconds (80 ms) or once every CET period, where the CET period may have a configurable periodicity. Each of a number of operators (e.g., different PLMNs) in the unlicensed radio frequency spectrum band may be provided a separate subframe (shown) or subframes (not shown) for transmitting CETs. A subframe in which a CET may be transmitted may be referred to as a preconfigured CET occasion. In some examples, CETs may be used by a UE to transmit access requests as part of a random access procedure to access a network. However, as mentioned above, such CET occasions may be relatively infrequent, and in some deployments may not be utilized at all, and thus additional resources for transmitting an access request may be desirable.

Figure 4:
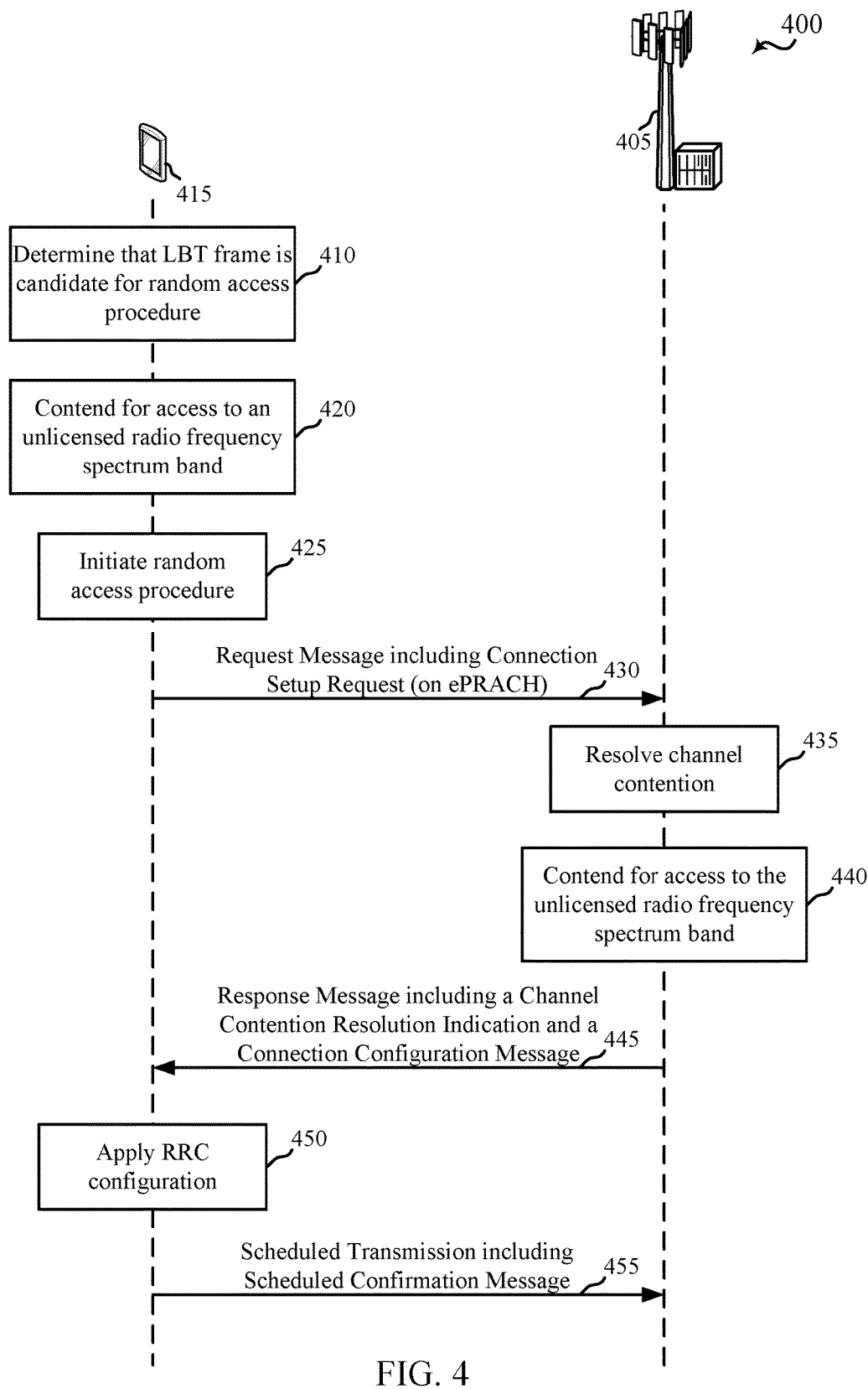
FIG. 4 shows a message flow between a user equipment (UE) and a base station during a random access channel communication, in accordance with various aspects of the present disclosure.

FIG. 4 shows a message flow 400 between a UE 415 and a base station 405, in accordance with various aspects of the present disclosure. In some examples, the UE 415 may be an example of aspects of one or more of the UEs 115, 215, 215-*a*, 215-*b*, or 215-*c* described with reference to FIG. 1 or 2. In some examples, the base station 405 may be an example of aspects of one or more of the base stations 105, 205, or 205-*a* described with reference to FIG. 1 or 2. The base station 405 may be part of a cell that operates in an unlicensed radio frequency spectrum band, and messages may be transmitted between the UE 415 and the base station 405 over the unlicensed radio frequency spectrum band (and optionally, over a licensed radio frequency spectrum band).

As shown in FIG. 4, the UE 415 may determine at block 410 that a LBT frame is a candidate for a random access procedure. In some examples, the UE 415 may receive signaling (e.g., via SIB or eSIB) that indicates certain subframes of LBT radio frames include ePRACH resources. In some examples, such subframes may be configured to have a higher frequency than CET transmissions, and may thus provide additional opportunities for UE 415 to transmit an access request message as part of an ePRACH procedure. In some examples, UE 415 may determine that another node has transmitted a CUBS, indicating that the radio frame is occupied for other transmissions, in which case the UE 415 may determine that the LBT frame is not a candidate for the random access procedure even though a particular subframe had been configured to include ePRACH resources. If the UE 415 determines that the unlicensed radio frequency spectrum band is unoccupied by another node during the identified subframe (e.g., a CUBS is not detected from a prior subframe), the UE 415 contends for access to the unlicensed radio frequency spectrum band, as indicated at block 420. The contention for access may be through a contention-based access procedure (e.g., a CCA procedure). The contention-based access procedure may be performed irrespective of whether the base station has access to the unlicensed radio frequency spectrum band. In some examples, a time window during the identified subframe for performing the contention-based access procedure are may be determined based at least in part on the identified subframe and ePRACH resources identified in the subframe.

If the UE 415 wins channel contention, the UE 415 may initiate a random access procedure as indicated at block 425, and transmit a request message 430 that may include a connection setup request using the ePRACH resources. In some examples, the request message 430 may be an unscheduled request message, and may be transmitted over the unlicensed radio frequency spectrum band. In some examples, the request message 430 may include one or more of a connection setup request (e.g., an RRC request), a connection reestablishment request (e.g., an RRC connection reestablishment request), a buffer status report (BSR), a device identifier, or a cause value (e.g., a reason why a cell is being accessed). In some examples, the request message may include an explicit or implicit request for an uplink grant. The device identifier may include, for example, a UE identifier (UE ID), a non-access stratum identifier (NAS ID), a cell radio network temporary identifier (C-RNTI), or a random number.

In response to transmitting the request message 430, the UE 415 may continue the random access procedure by monitoring for a response message 445. The UE 415 may receive the response message 445 (e.g., an enhanced random access response (eRAR)) over the unlicensed radio frequency spectrum band. The response message 445 may include, for example, one or more of a connection configuration message (e.g., an RRC response), a channel contention resolution indication, a scheduled uplink grant (including, in some examples, a modulation and coding scheme (MCS) index), a device identifier, or an indication of a timing adjustment. The response message 445 may be addressed to a random access radio network temporary identifier (RA-RNTI). In some examples, the response message 445 may include a layer two (L2) message (e.g., a random access response (RAR)) or a layer three (L3) message (e.g., an RRC configuration).

In some examples, the base station 405 may transmit the response message 445 after resolving channel contention, if any, between a plurality of UEs for which request messages have been received on the ePRACH, as indicated at block 435, and after contending for and winning access to the unlicensed radio frequency spectrum band at block 440. Alternatively, in some examples the base station 405 may transmit the response message 445 over the unlicensed radio frequency spectrum band during a preconfigured downlink CET occasion. In some examples, the response message 445 may be transmitted by the base station 405 and received by the UE 415 within a time window, such as a connection establishment time window (e.g., in the context of a connection setup or connection reestablishment). The response message 445 may be transmitted at a power indicated by at least one power control parameter for the ePRACH, which power control parameter may differ from a power control parameter used for an ePUSCH. The time window (or windows) and at least one power control parameter may be indicated by the base station 405 in a SIB. In some examples, a time window may be indicated in terms of a delay following the UE's transmission of the request message 430.

Following receipt of the response message 445, the UE 415 may apply RRC configuration settings from the response message 445, as indicated at block 450, and transmit a scheduled transmission 455 over the unlicensed radio frequency spectrum band. The scheduled transmission 455 may be transmitted in accordance with an uplink grant received as part of the response message 445. In some examples, the scheduled transmission 455 may include a scheduled confirmation message (e.g., an RRC confirmation) or a NAS service request. Thus, the call flow of FIG. 4 may provide additional random access opportunities for a UE 415 seeking to access the network through base station 405. In some examples, the UE 415 may contend for channel access at any point during the identified subframe. However, in the event that another node has transmitted a CUBS indicating a transmission during the identified subframe, a transmission from UE 415 may have a collision with such a transmission. Such collisions may degrade network performance, and in some examples, as will be discussed in more detail below, a SePRACH process may be provided to help reduce such collisions. In some examples, a base station 405 may configure ePRACH and SePRACH operation for UE 415 based on network characteristics being experienced at a particular time. For example, in situations where congestion is present from a number of different nodes seeking to transmit, a base station 505 may configure ePRACH and SePRACH to adjust the loads on the available random access resources, as also will be discussed in more detail below.

Figure 5:
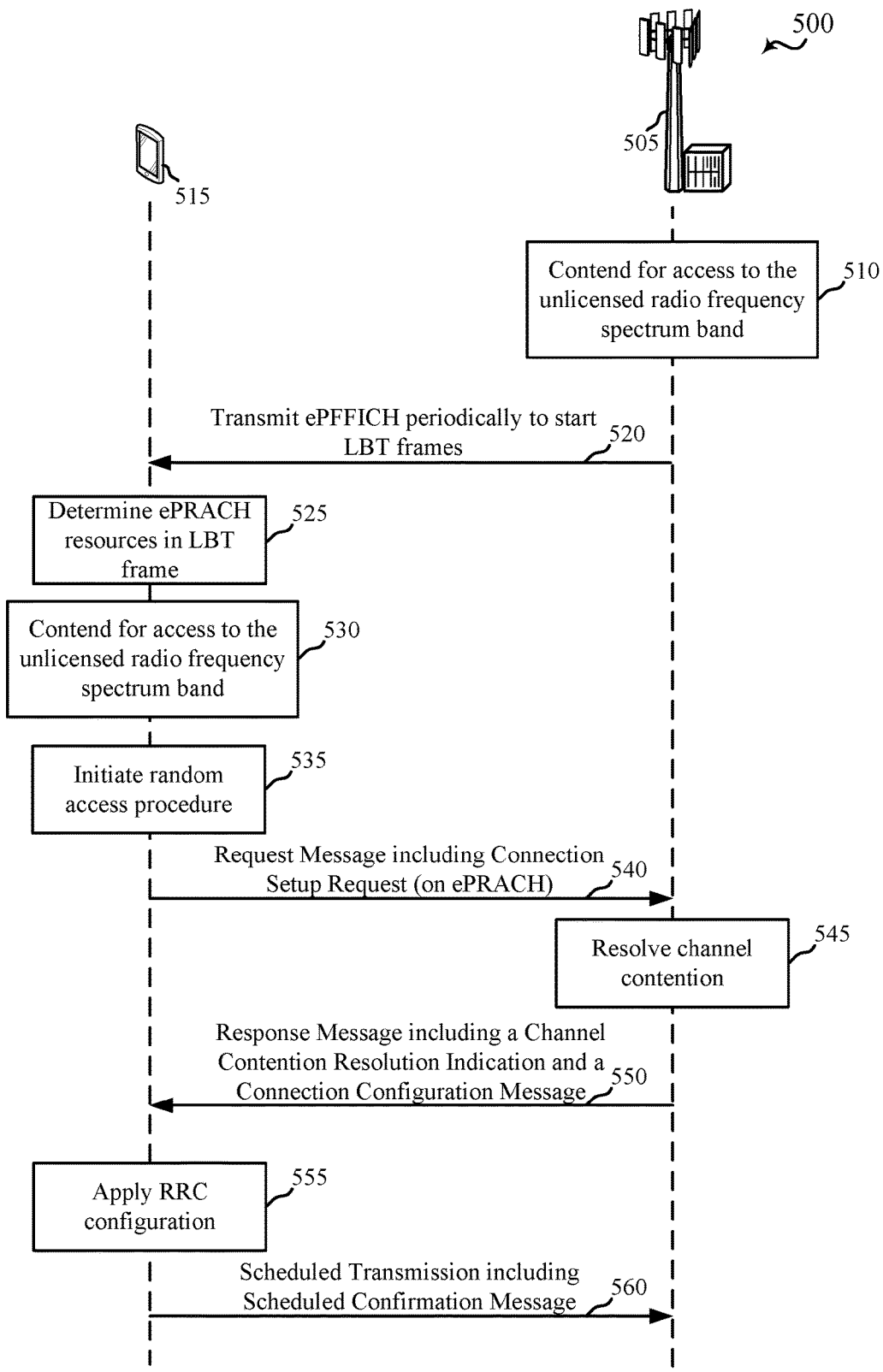
FIG. 5 shows another message flow between a UE and a base station during a random access channel communication, in accordance with various aspects of the present disclosure.

FIG. 5 shows a message flow 500 between a UE 515 and a base station 505, in accordance with various aspects of the present disclosure. In some examples, the UE 515 may be an example of aspects of one or more of the UEs 115, 215, 215-a, 215-b, 215-c, or 415 described with reference to FIG. 1, 2, or 4. In some examples, the base station 505 may be an example of aspects of one or more of the base stations 105, 205, 205-a, or 405 described with reference to FIG. 1, 2 or 4. The base station 505 may be part of a cell that operates in an unlicensed radio frequency spectrum band, and messages may be transmitted between the UE 515 and the base station 505 over the unlicensed radio frequency spectrum band (and optionally, over a licensed radio frequency spectrum band).

As shown in FIG. 5, base station 505 may contend for access to the unlicensed radio frequency spectrum band at block 510. If contention is won, the base station 505 may transmit an ePFFICH transmission 520 as part of a periodic attempt to start an LBT frame. The UE 515 may receive the ePFFICH transmission 520 and determine available ePRACH resources within the LBT frame that may be used to transmit a random access request message, as indicated at block 525. In some examples, the ePFFICH transmission 520 may include signaling, or other signaling may have been provided by the base station 505 (e.g., via a previously transmitted SIB or eSIB), that indicates certain subframes of LBT radio frames include ePRACH resources. In some examples, the base station 505 may attempt to transmit ePFFICH message 520 at a higher frequency than CET transmissions, and may thus provide additional opportunities for UE 515 to transmit an access request message as part of an ePRACH procedure. In some examples, the UE 515 may determine an LBT frame boundary based on the ePFFICH message 520, which may be used for timing of subsequent transmissions from the UE 515.

At block 530 the UE 515 may contend for access to the unlicensed radio frequency spectrum band. The contention for access may be through a contention-based access procedure (e.g., a CCA procedure). If the UE 515 wins channel contention, the UE 515 may initiate a random access procedure as indicated at block 535, and transmit a request message 540 that may include a connection setup request using the ePRACH resources, similarly as discussed above with respect to FIG. 4.

In response to transmitting the request message 540, the UE 515 may continue the random access procedure by monitoring for a response message 550. The UE 515 may receive the response message 550 (e.g., an eRAR) over the unlicensed radio frequency spectrum band, similarly as discussed above with respect to FIG. 4. In some examples, the base station 505 may transmit the response message 550 after resolving channel contention, if any, between a plurality of UEs for which request messages have been received on the ePRACH, as indicated at block 545. Alternatively, in some examples the base station 505 may transmit the response message 550 over the unlicensed radio frequency spectrum band during a preconfigured downlink CET occasion. In some examples, the response message 550 may be transmitted by the base station 505 and received by the UE 515 within a time window, such as a connection establishment time window (e.g., in the context of a connection setup or connection reestablishment). The response message 550 may be transmitted at a power indicated by at least one power control parameter for the ePRACH, which power control parameter may differ from a power control parameter used for an ePUSCH. The time window (or windows) and at least one power control parameter may be indicated by the base station 505 in a SIB. In some examples, a time window may be indicated in terms of a delay following transmission of the request message 540 by the UE.

Following receipt of the response message 550, the UE 515 may apply RRC configuration settings from the response message 550, as indicated at block 555, and transmit a scheduled transmission 560 over the unlicensed radio frequency spectrum band. The scheduled transmission 560 may be transmitted in accordance with an uplink grant received as part of the response message 550. In some examples, the scheduled transmission 560 may include a scheduled confirmation message (e.g., an RRC confirmation) or a NAS service request.

Figure 6:
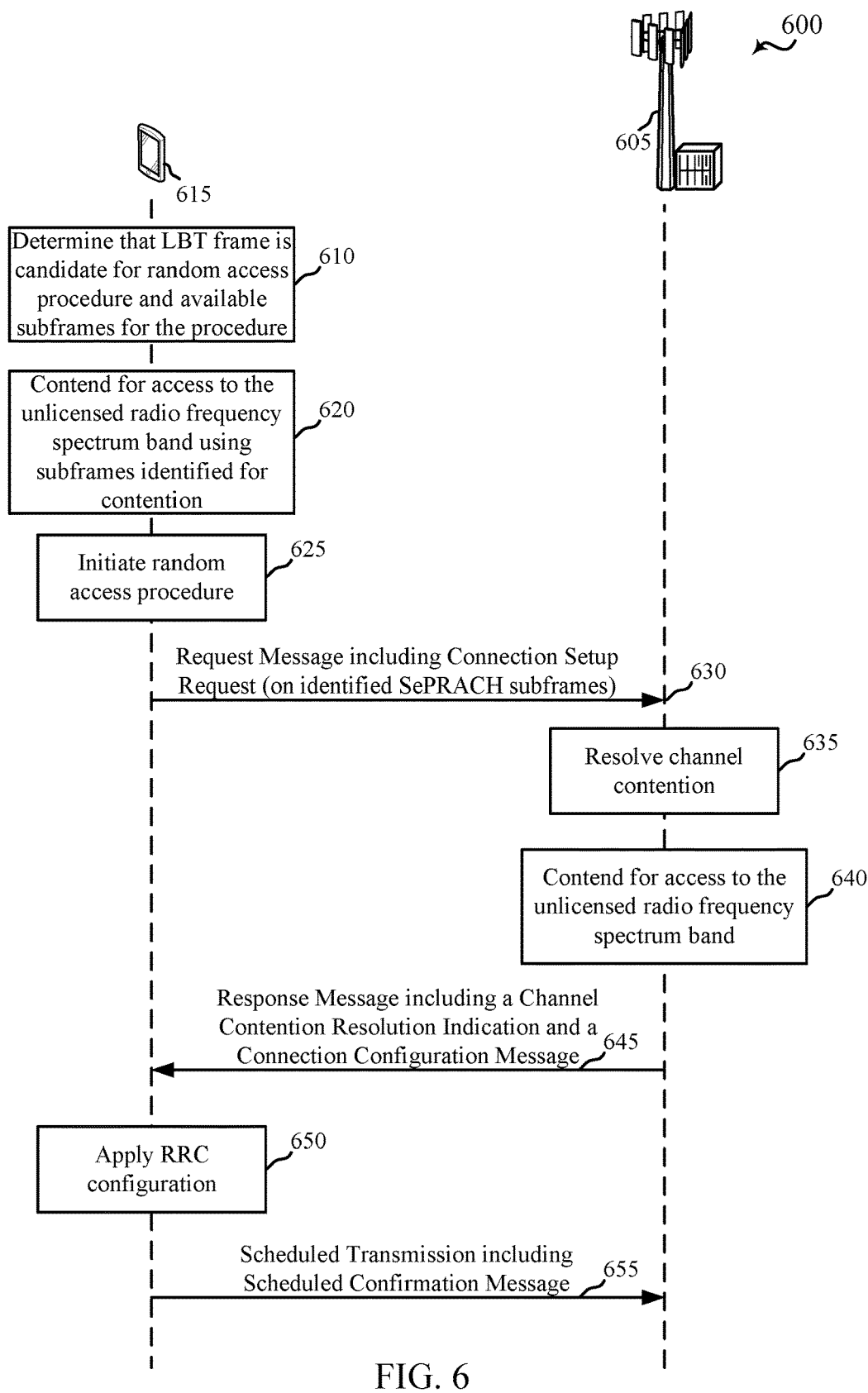
FIG. 6 shows another message flow between a UE and a base station during a random access channel communication, in accordance with various aspects of the present disclosure.

FIG. 6 shows a message flow 600 between a UE 615 and a base station 605, in accordance with various aspects of the present disclosure. In some examples, the UE 615 may be an example of aspects of one or more of the UEs 115, 215, 215-a, 215-b, 215-c, 415, or 515 described with reference to FIG. 1, 2, 4, or 5. In some examples, the base station 605 may be an example of aspects of one or more of the base stations 105, 205, 205-a, 405, or 505 described with reference to FIG. 1, 2, 4, or 5. The base station 605 may be part of a cell that operates in an unlicensed radio frequency spectrum band, and messages may be transmitted between the UE 615 and the base station 605 over the unlicensed radio frequency spectrum band (and optionally, over a licensed radio frequency spectrum band).

As shown in FIG. 6, the UE 615 may determine at block 610 that an LBT frame is a candidate for a random access procedure and may determine available subframes within the LBT frame that include random access request resources, such as SePRACH resources. In some examples, the UE 615 may receive signaling (e.g., via SIB or eSIB) that indicates certain subframes of LBT radio frames include SePRACH resources. In some examples, such subframes may be configured to have a higher frequency than CET transmissions and a have a higher frequency than regular ePRACH resources, and may thus provide additional opportunities for UE 615 to transmit an access request message as part of a random access procedure. In some examples, UE 615 may determine that another node has transmitted a CUBS, indicating that the radio frame is occupied for other transmissions, in which case the UE 615 may determine that the LBT frame is not a candidate for the random access procedure even though a particular subframe had been configured to include SePRACH resources. If the UE 615 determines that the unlicensed radio frequency spectrum band is unoccupied by another node during the identified subframe (e.g., a CUBS is not detected from a prior subframe), the UE 615 contends for access to the unlicensed radio frequency spectrum band, as indicated at block 620. The contention for access may be through a contention-based access procedure (e.g., a CCA procedure). The contention-based access procedure may be performed irrespective of whether the base station has access to the unlicensed radio frequency spectrum band. In some examples, a time window during the identified subframe for performing the contention-based access procedure are may be determined based at least in part on the identified subframe and ePRACH resources identified in the subframe.

The time window for performing the contention-based access procedure may be selected so as to provide persistent CCA/eCCA after accounting for D-CUBS detection delay. For example, UE 615 may not contend for channel access if it is determined that another node will occupy the channel for the identified subframe. In some examples, a D-CUBS may be transmitted during a last symbol of a subframe (e.g., symbol 13), that may be received by UE 615. The actual detection of the D-CUBS signal may occur after hardware and software processing of the received signal at the UE 615. For example, a hardware delay may last for three symbols, and a software delay may last for somewhat more than two more symbols. Thus, within the identified subframe, the UE 615 may detect the D-CUBS signal only beginning at the sixth symbol of the subframe, and the UE 615 may not attempt a CCA prior to the expiration of the hardware and software delays. Additionally, in some examples, the last symbol of the identified subframe may be identified as unavailable for transmission of an access request in order to provide a listening opportunity for the UE 615 to receive any D-CUBS that may be transmitted during that symbol, along with some time for switching the UE 615 from a transmit mode to a receive mode. Accordingly, in such examples, the final two symbols of the subframe may be indicated as not available for transmission.

This leaves a certain number of symbols of the subframe available for both channel contention and transmission of the access request message by the UE 615. For example, if hardware and software delays extend into the sixth symbol of a subframe, and the last two symbols are left empty to protect receipt of D-CUBS, a UE 615 may have less than 7 symbols available for channel contention and transmission of the request message. In some examples, a first subset of available symbols are identified for performance of contention-based channel access, and a second subset of the symbols are identified for transmission of the access request message. In some examples, the base station 605 may configure two symbols as available for an access request message, with these two symbols being identified as SePRACH resources for the identified subframe. A first symbol of the second subset of symbols may be used for DMRS, and a second symbol of the second subset of symbols may be used for transmission of data. The rate for data transmission may be one-half of an available date rate, and may be transmitted using Quadrature Phase Shift Keying (QPSK) using one interlace of the second symbol. In some examples, multiple UEs may be multiplexed using different DMRS shifts, different interlaces, or symbol repetition before signal processing that may be used to identify a symbol from a particular UE 615. In some examples, the UE 615 may not transmit a CUBS, which may provide additional symbols that are available for SePRACH messages. In some examples, the start of SePRACH resources may not be aligned with a subframe boundary and thus additional resources may be made available. Additionally or alternatively, the start of SePRACH resources may be aligned with a symbol boundary. Furthermore, a base station 605 may configure the first subset of symbols to be shorter, and the second subset of symbols to be longer, and provide additional SePRACH resources in such a manner.

If the UE 615 wins channel contention based on the available CCA/eCCA time window as discussed above, the UE 615 may initiate a random access procedure as indicated at block 625, and transmit a request message 630 that may include a connection setup request using the ePRACH resources, such as discussed above. In some examples, the request message 630 may be an unscheduled request message, and may be transmitted over the unlicensed radio frequency spectrum band using one or more symbols identified as SePRACH resources. In some examples, the request message 630 may include one or more of a connection setup request (e.g., an RRC request), a connection reestablishment request (e.g., an RRC connection reestablishment request), a BSR, a device identifier, or a cause value (e.g., a reason why a cell is being accessed). In some examples, the request message may include an explicit or implicit request for an uplink grant. The device identifier may include, for example, a UE ID, a NAS ID, a C-RNTI, or a random number.

In response to transmitting the request message 630, the UE 615 may continue the random access procedure by monitoring for a response message 645. The UE 615 may receive the response message 645 (e.g., an eRAR) over the unlicensed radio frequency spectrum band. The response message 645 may include, for example, one or more of a connection configuration message (e.g., an RRC response), a channel contention resolution indication, a scheduled uplink grant (including, in some examples, an MCS index), a device identifier, or an indication of a timing adjustment. The response message 645 may be addressed to a random access radio network temporary identifier (RA-RNTI). In some examples, the response message 645 may include an L2 message (e.g., a RAR) or an L3 message (e.g., an RRC configuration).

In some examples, the base station 605 may transmit the response message 645 after resolving channel contention, if any, between a plurality of UEs for which request messages have been received on the ePRACH, as indicated at block 635, and after contending for and winning access to the unlicensed radio frequency spectrum band at block 640. Alternatively, in some examples the base station 605 may transmit the response message 645 over the unlicensed radio frequency spectrum band during a preconfigured downlink CET occasion. In some examples, the response message 645 may be transmitted by the base station 605 and received by the UE 615 within a time window, such as a connection establishment time window (e.g., in the context of a connection setup or connection reestablishment). The response message 645 may be transmitted at a power indicated by at least one power control parameter for the ePRACH, which power control parameter may differ from a power control parameter used for an ePUSCH. The time window (or windows) and at least one power control parameter may be indicated by the base station 605 in a SIB. In some examples, a time window may be indicated in terms of a delay following the transmission of the request message 630 by the UE.

Following receipt of the response message 645, the UE 615 may apply RRC configuration settings from the response message 645, as indicated at block 650, and transmit a scheduled transmission 655 over the unlicensed radio frequency spectrum band. The scheduled transmission 655 may be transmitted in accordance with an uplink grant received as part of the response message 645. In some examples, the scheduled transmission 655 may include a scheduled confirmation message (e.g., an RRC confirmation) or a NAS service request. Thus, the call flow of FIG. 6 may provide additional random access opportunities for a UE 615 seeking to access the network through base station 605. In some examples, the UE 615 may contend for channel access at any point during the identified subframe. However, in the event that another node has transmitted a CUBS indicating a transmission during the identified subframe, a transmission from UE 615 may have a collision with such a transmission. Such collisions may degrade network performance, and in some examples, as will be discussed in more detail below, a SePRACH process may be provided to help reduce such collisions. In some examples, a base station 605 may configure ePRACH and SePRACH operation for UE 615 based on network characteristics being experienced at a particular time. For example, in situations where congestion is present from a number of different nodes seeking to transmit, a base station 505 may configure ePRACH and SePRACH to adjust the loads on the available random access resources, as also will be discussed in more detail below.

Figure 7:
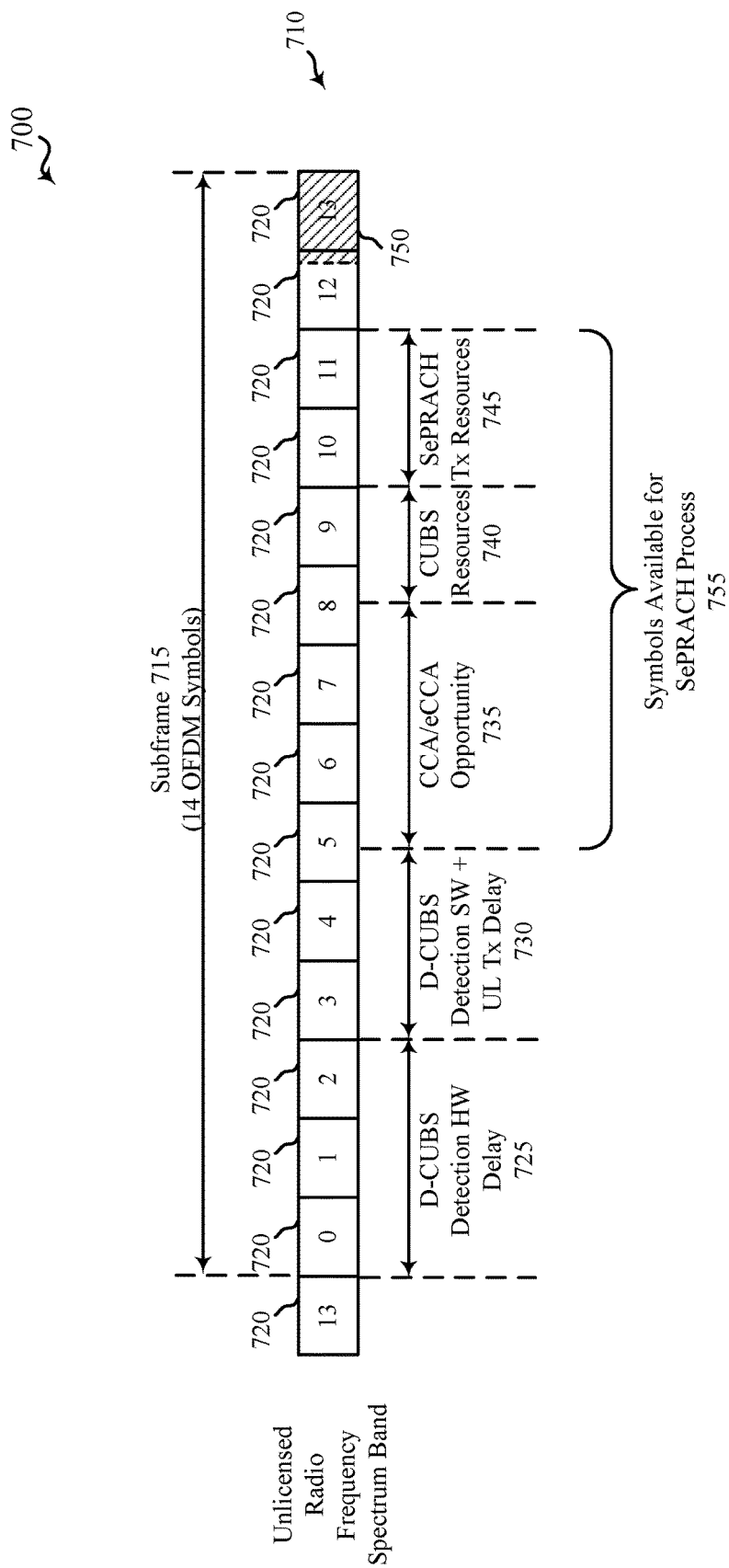
FIG. 7 shows an example of a wireless communication over an unlicensed radio frequency spectrum band using a shortened physical random access channel procedure, in accordance with various aspects of the present disclosure.

FIG. 7 shows an example 700 of a wireless communication 710 using SePRACH resources over an unlicensed radio frequency spectrum band, in accordance with various aspects of the present disclosure. In some examples, the wireless communication 710 may include an LBT radio subframe 715 that may include 14 symbols 720. As shown, the LBT radio subframe 715 may include SePRACH transmission resources 745 that may include two symbols, the timing of which may be determined based on a D-CUBS hardware detection delay 725, a D-CUBS software and switch up uplink transmission delay 730, and a configured length of a CCA/eCCA opportunity 735, which may include CUBS resources 740. Similarly as discussed above with respect to FIG. 6, a portion 750 of subframe 715 may be left empty to allow for the UE to switch from uplink to downlink mode, and listen for D-CUB S in a last symbol of subframe 715. In such a manner, if the base station misses a transmission from a UE on the CUBS resources 740 or a DMRS in the SePRACH resources 745, and sends D-CUBS beginning in the UE SePRACH resources 745, the D-CUBS from the base station during the last symbol me be received by other nodes without interference.

In some examples, one or more aspects of the subframe 715 may be advertised by a base station, such as the base station 105, 205, 205-a, 405, 505, or 605 described with reference to FIG. 1, 2, 4, 5, or 6. For example, a base station may advertise which symbols 720 of subframe 715 are available as SePRACH resources 745 to transmit the access request message to the base station. A UE may then, based on hardware and software delays and based on whether transmission of a CUBS is configured, determine the available portion of subframe 715 that is available for CCA/eCCA opportunity 735. Through advertising the available SePRACH resources 745, a base station may prohibit the transmission of request messages on an SePRACH during some subframes, even when a UE is able to win contention for access to the unlicensed radio frequency spectrum band. In some examples, a base station may also prohibit the transmission of request messages on SePRACH resources 745 in subframes where a primary synchronization signal (PSS) or a secondary synchronization signal (SSS) may be transmitted; or, when operating in a time-division duplexing mode, a base station may prohibit the transmission of request messages on SePRACH resources during downlink-only subframes. Thus, a base station may monitor SePRACH resources for request messages irrespective of whether the base station has won channel contention or not.

As discussed above, SePRACH resources 745 may be in addition to other available resources for a UE to transmit a random access request message. In some examples, a UE may determine that one or more other resources are available for transmission of the request message, and select one of the available resources for transmission of the request message based at least in part on a prioritization of available resources. For example, a base station may configure prioritization of available resources for transmission of a request message based on a next available resource for transmission of the request message. Thus, if a UE determines that a request message is to be transmitted, it simply determines the next available resource for the transmission, such as a CET, ePRACH resource, or SePRACH resource, and uses the determined resource. In some examples the prioritization of available resources for transmission of the request message is based on a prioritization of resources received in a SIB or eSIB. In still further examples, a UE may prioritize ePRACH ahead of SePRACH, and only use SePRACH resources if an LBT frame with ePRACH resources is note detected during a time window since the start of the UE random access procedure.

In still further examples, a base station may prioritize of available resources for transmission of the request message is based on a biased random selection of available resources, and may thus control loading of certain resources. For example, in a SIB or eSIB, the base station may include a parameter to control a load of request messages on one or more of the available resources for transmission of the request message. Such a parameter may, for example, configure a UE with a bias, and the UE may essentially flip a biased coin (e.g., 60% likelihood of one outcome, 40% likelihood of the other outcome) to determine whether to use ePRACH or SePRACH resources. The base station may adjust the parameter, such as by adjusting the bias up or down, to increase or reduce the SePRACH load. Additionally, in some examples, if a UE detects SePRACH interference, the UE may feedback SePRACH interference information to the base station to prevent rate control backoff.

Figure 8:
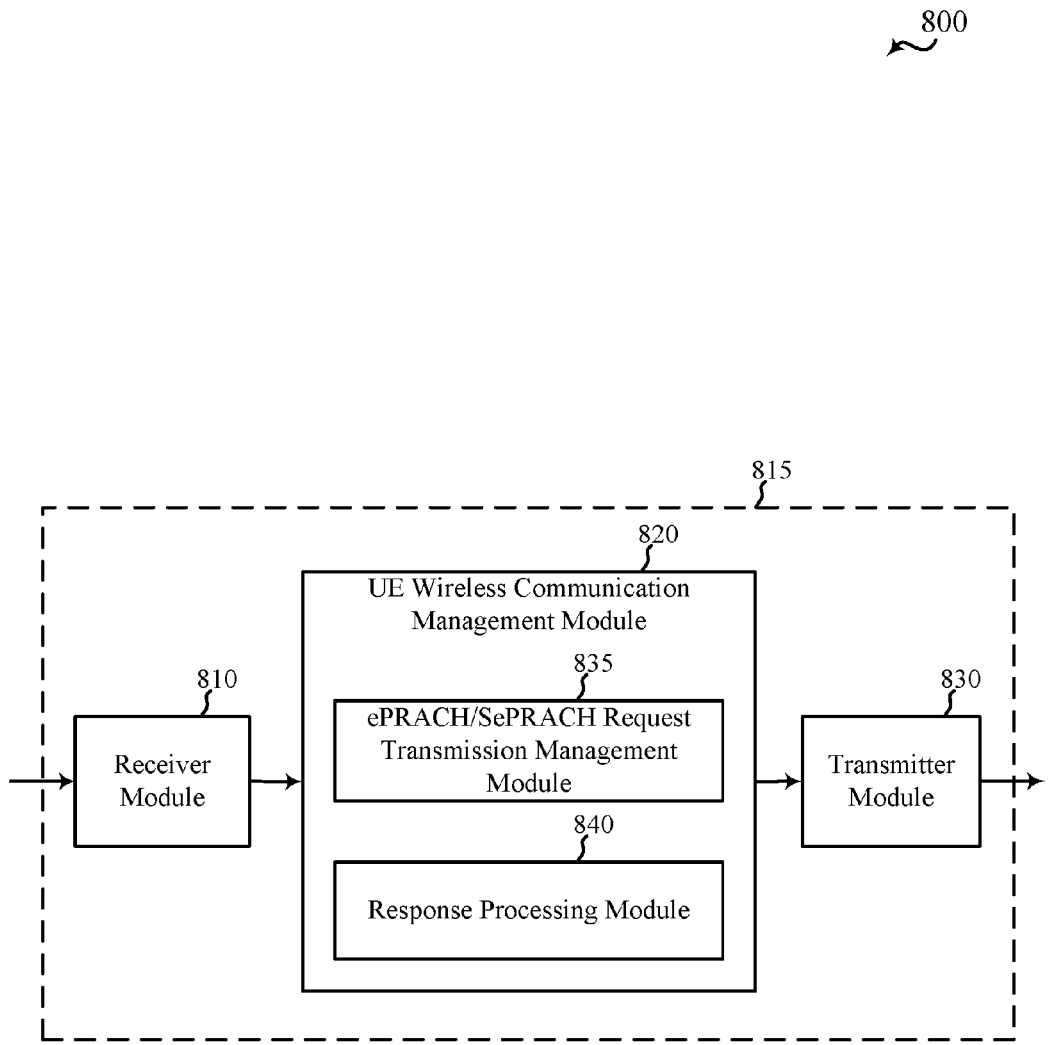
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs 115, 215, 215-a, 215-b, 215-c, 415, 515, or 615 described with reference to FIG. 1, 2, 4, 5, or 6. The apparatus 815 may also be or include a processor. The apparatus 815 may include a receiver module 810, a UE wireless communication management module 820, or a transmitter module 830. Each of these modules may be in communication with each other.

The modules of the apparatus 815 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom Integrated Circuits (ICs)), which may be programmed in any manner known in the art. The functions of each module may also be implemented, in whole or in part, with instructions embodied in a memory, formatted to be executed by one or more general or application-specific processors.

In some examples, the receiver module 810 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIGS. 1-7. The receiver module 810 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 830 may include at least one RF transmitter, such as at least one RF transmitter operable to transmit over the licensed radio frequency spectrum band or the unlicensed radio frequency spectrum band. The transmitter module 830 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the UE wireless communication management module 820 may be used to manage one or more aspects of wireless communication for the apparatus 815. In some examples, the UE wireless communication management module 820 may include an ePRACH/SePRACH request transmission management module 835 or a response processing module 840.

In some examples, the ePRACH/SePRACH request transmission management module 835 may be used to transmit a request message. The request message may be transmitted on an ePRACH or SePRACH resource to access a cell that operates in an unlicensed radio frequency spectrum band. In some examples, the request message may be an unscheduled request message over the unlicensed radio frequency spectrum band. In some examples, the request message may include at least one of: a connection setup request; a connection reestablishment request; a buffer status report; a device identifier; or a cause value.

In some examples, the response processing module 840 may be used to receive, in response to transmitting the request message, a response message. The response message may be received over the unlicensed radio frequency spectrum band. In some examples, the response message may include at least one of: a connection configuration message; a channel contention resolution indication; a scheduled uplink grant; a device identifier; or an indication of a timing adjustment.

In some examples of the apparatus 815, the request message may be further configured or transmitted using resources as described with reference to FIGS. 3-7, or the response message may be further configured or received as described with reference to FIGS. 3-7.

Figure 9:
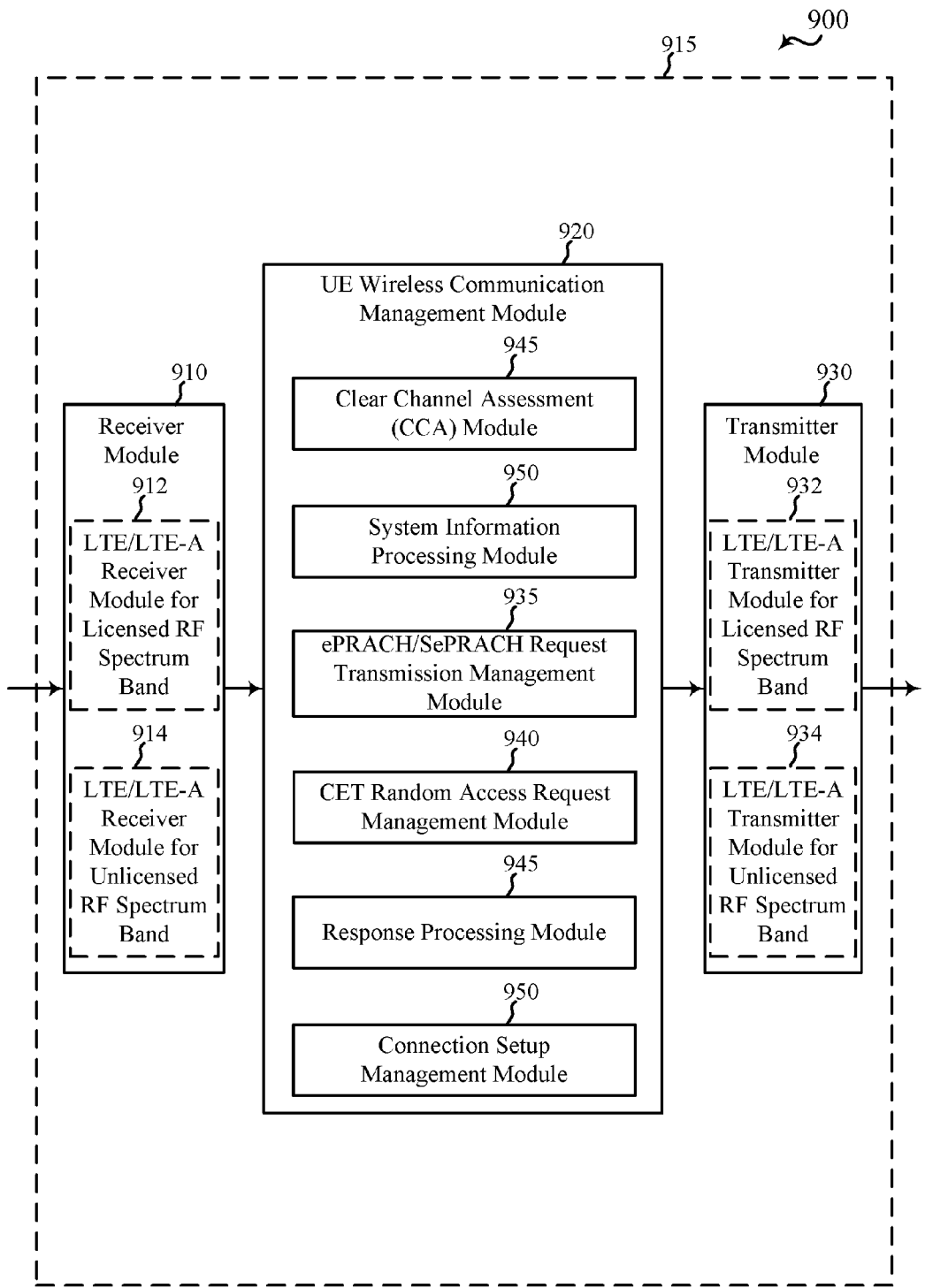
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 215-a, 215-b, 215-c, 415, 515, or 615 described with reference to FIG. 1, 2, 4, 5, or 6, or aspects of the apparatus 815 described with reference to FIG. 8. The apparatus 915 may also be or include a processor. The apparatus 915 may include a receiver module 910, a UE wireless communication management module 920, or a transmitter module 930. Each of these modules may be in communication with each other.

The modules of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIGS. 1-7. The receiver module 910 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 912), and an LTE/LTE-A receiver module for communicating over the unlicensed radio frequency spectrum band (e.g., LTE/LTE-A receiver module for unlicensed RF spectrum band 914). The receiver module 910, including the LTE/LTE-A receiver module for licensed RF spectrum band 912 or the LTE/LTE-A receiver module for unlicensed RF spectrum band 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 930 may include at least one RF transmitter, such as at least one RF transmitter operable to transmit over the licensed radio frequency spectrum band or the unlicensed radio frequency spectrum band. The transmitter module 930 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 932), and an LTE/LTE-A transmitter module for communicating over the unlicensed radio frequency spectrum band (e.g., LTE/LTE-A transmitter module for unlicensed RF spectrum band 934). The transmitter module 930, including the LTE/LTE-A transmitter module for licensed RF spectrum band 932 or the LTE/LTE-A transmitter module for unlicensed RF spectrum band 934, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the UE wireless communication management module 920 may be used to manage one or more aspects of wireless communication for the apparatus 915. In some examples, the UE wireless communication management module 920 may include a CCA module 945, a system information processing module 950, an ePRACH/SePRACH request transmission management module 935, a CET random access request management module 940, a response processing module 945, or a connection setup management module 950.

In some examples, the CCA module 945 may contend for access to the unlicensed radio frequency spectrum band. In some examples, the CCA module 945 may contend for access to the unlicensed radio frequency spectrum band by performing a U-CCA, as described, for example, with reference to FIGS. 3-6. Upon winning a contention for access to the unlicensed radio frequency spectrum band, the CCA module 945 may enable the UE wireless communication management module 920 to transmit a CUBS over the unlicensed radio frequency spectrum band.

In some examples, the system information processing module 950 may be used to receive, in a SIB, at least one of: a mapping of resource sets of an ePRACH/SePRACH to frequency-interlaced resource blocks; an indication of a transport block size for the ePRACH/SePRACH; at least one power control parameter for the ePRACH/SePRACH; an indication of at least one subframe and symbol available to transmit a request message; or an indication of at least one time window for reception of a response message.

In some examples, the system information processing module 950 may be used to receive, an indication of a dedicated resource set of an ePRACH/SePRACH, such as in a SIB or eSIB, for example. The system information may also include an indication of a transport block size for the ePRACH/SePRACH; at least one power control parameter for the ePRACH/SePRACH; an indication of at least one subframe or symbol available to transmit a request message; or an indication of at least one time window for reception of a response message.

In some examples, the ePRACH/SePRACH request transmission management module 935 may be used to select, from among the resource sets of the ePRACH/SePRACH/CET, a resource set for transmitting a request message. In some examples, the ePRACH/SePRACH request transmission management module 935 may be used to transmit a request message. The request message may be transmitted on the ePRACH/SePRACH using the selected resource set, to access a cell that operates in the unlicensed radio frequency spectrum band. In some examples, the request message may be an unscheduled request message transmitted over the unlicensed radio frequency spectrum band.

In some examples, the ePRACH/SePRACH request transmission management module 935 may be used to transmit a request message upon the CCA module 945 winning a contention for access to the unlicensed radio frequency spectrum band. In other examples, the ePRACH/SePRACH request transmission management module 935 may transmit the request message irrespective of whether a base station has won contention for access to the unlicensed radio frequency spectrum band. In some examples, the CET random access request module 940 may be used to manage random access request messages transmitted using CET resources.

In some examples, the response processing module 945 may monitor the unlicensed radio frequency spectrum band for the response message. In some examples, the monitoring may occur during at least one of the at least one connection establishment time window. When a request message transmitted using the ePRACH/SePRACH request transmission management module 935 includes a connection setup request, the response message received using the response processing module 940 may include a channel contention resolution indication and a connection configuration message. When a request message transmitted using the ePRACH/SePRACH request transmission management module 935 includes a connection reestablishment request, the response message received using the response processing module 940 may include a channel contention resolution indication. In some examples, the response message may also include a device identifier or an indication of a timing adjustment.

In some examples, the connection setup management module 950 may be used to manage a connection setup. The connection setup management module 950 may cause the ePRACH/SePRACH request transmission management module 935 to select a contention-based resource set for transmitting a request message, and cause the ePRACH/SePRACH request transmission management module 935 to transmit a request message including a connection setup request. In some examples, the connection setup management module 950 may cause the response processing module 945 to monitor the unlicensed radio frequency spectrum band for a response. The connection setup management module 950 may also be used to transmit a scheduled confirmation message in response to receiving the response message.

In some examples of the apparatus 915, the request message may be further configured or transmitted as described with reference to FIGS. 3-7, or the response message may be further configured or received as described with reference to FIGS. 3-7.

Figure 10:
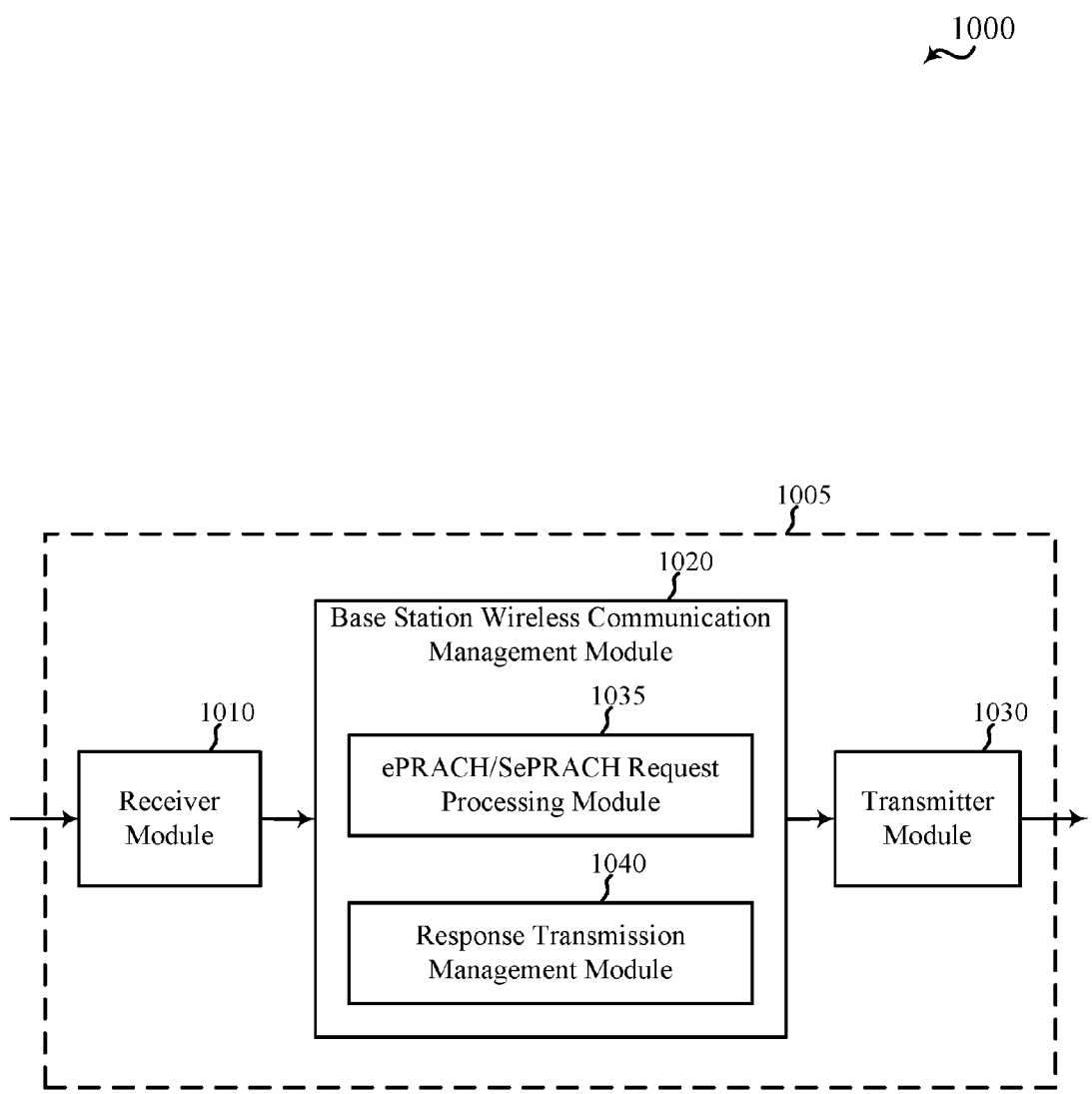
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. The apparatus 1005 may be an example of aspects of one or more of the base stations 105, 205, 205-a, 405, 505, or 605 described with reference to FIG. 1, 2, 4, 5, or 6. The apparatus 1005 may also be or include a processor. The apparatus 1005 may include a receiver module 1010, a base station wireless communication management module 1020, or a transmitter module 1030. Each of these modules may be in communication with each other.

The modules of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIGS. 1-7. The receiver module 1010 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1030 may include at least one RF transmitter, such as at least one RF transmitter operable to transmit over the licensed radio frequency spectrum band or the unlicensed radio frequency spectrum band. The transmitter module 1030 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the base station wireless communication management module 1020 may be used to manage one or more aspects of wireless communication for the apparatus 1005. In some examples, the base station wireless communication management module 1020 may include an ePRACH/SePRACH request processing module 1035 or a response transmission management module 1040.

In some examples, the ePRACH/SePRACH request processing module 1035 may be used to receive a request message over resources that may be monitored for such messages. The request message may be received on an ePRACH/SePRACH, from a UE, to access a cell that operates in the unlicensed radio frequency spectrum band (e.g., a cell including the apparatus 1005). In some examples, the request message may be an unscheduled request message. In some examples, the request message may be received over the unlicensed radio frequency spectrum band. In some examples, the request message may include at least one of: a connection setup request; a connection reestablishment request; a buffer status report; a device identifier; or a cause value.

In some examples, the response transmission management module 1040 may be used to transmit, in response to receiving a request message, a response message. The response message may be transmitted over the unlicensed radio frequency spectrum band. In some examples, the response message may include at least one of: a connection configuration message; a channel contention resolution indication; a scheduled uplink grant; a device identifier; or an indication of a timing adjustment.

In some examples of the apparatus 1005, the request message may be further configured or received as described with reference to FIGS. 3-7, or the response message may be further configured or transmitted as described with reference to FIGS. 3-7.

Figure 11:
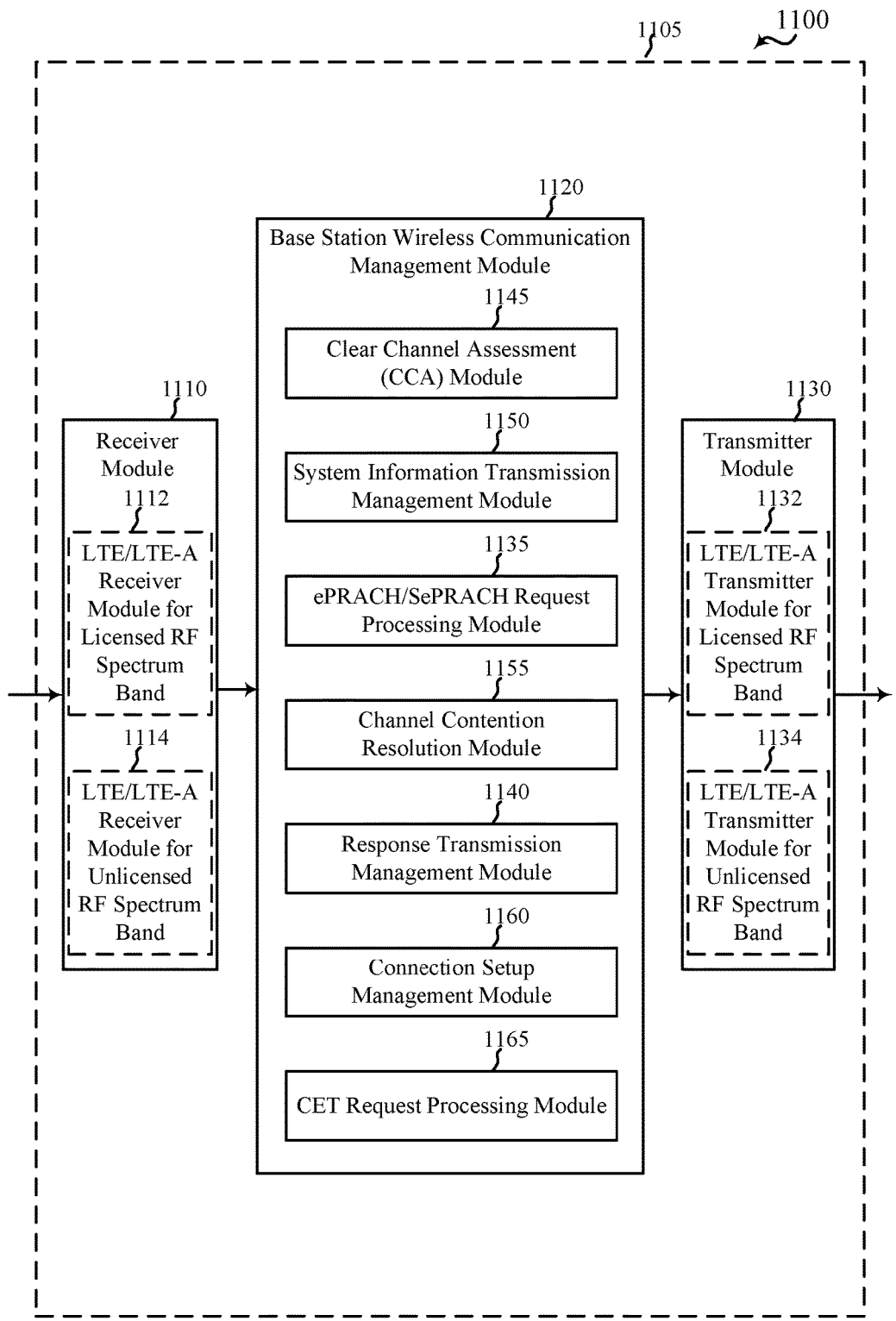
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of one or more of the base stations 105, 205, 205-*a*, 405, 505, or 605 described with reference to FIG. 1, 2, 4, 5, or 6, or aspects of the apparatus 1005 described with reference to FIG. 10. The apparatus 1105 may also be or include a processor. The apparatus 1105 may include a receiver module 1110, a base station wireless communication management module 1120, or a transmitter module 1130. Each of these modules may be in communication with each other.

The modules of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1110 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIGS. 1-7. The receiver module 1110 may in some cases include separate receivers for the licensed radio frequency spectrum band and the unlicensed radio frequency spectrum band. The separate receivers may, in some examples, take the form of an LTE/LTE-A receiver module for communicating over the licensed radio frequency spectrum band (e.g., LTE/LTE-A receiver module for licensed RF spectrum band 1112), and an LTE/LTE-A receiver module for communicating over the unlicensed radio frequency spectrum band (e.g., LTE/LTE-A receiver module for unlicensed RF spectrum band 1114). The receiver module 1110, including the LTE/LTE-A receiver module for licensed RF spectrum band 1112 or the LTE/LTE-A receiver module for unlicensed RF spectrum band 1114, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1130 may include at least one RF transmitter, such as at least one RF transmitter operable to transmit over the licensed radio frequency spectrum band or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of an LTE/LTE-A transmitter module for communicating over the licensed radio frequency spectrum band (e.g., LTE/LTE-A transmitter module for licensed RF spectrum band 1132), and an LTE/LTE-A transmitter module for communicating over the unlicensed radio frequency spectrum band (e.g., LTE/LTE-A transmitter module for unlicensed RF spectrum band 1134). The transmitter module 1130, including the LTE/LTE-A transmitter module for licensed RF spectrum band 1132 or the LTE/LTE-A transmitter module for unlicensed RF spectrum band 1134, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the base station wireless communication management module 1120 may be used to manage one or more aspects of wireless communication for the apparatus 1105. In some examples, the base station wireless communication management module 1120 may include a CCA module 1145, a system information transmission management module 1150, an ePRACH/SePRACH request processing module 1135, a channel contention resolution module 1155, a response transmission management module 1140, a connection setup management module 1160, or a CET request processing module 1165.

In some examples, the CCA module 1145 may contend for access to the unlicensed radio frequency spectrum band. In some examples, the CCA module 1145 may contend for access to the unlicensed radio frequency spectrum band by performing a D-CCA, as described, for example, with reference to FIGS. 3-6. Upon winning a contention for access to the unlicensed radio frequency spectrum band, the CCA module 1145 may enable the base station wireless communication management module 1120 to transmit a CUBS over the unlicensed radio frequency spectrum band.

In some examples, the system information transmission management module 1150 may be used to transmit, in a SIB, at least one of: a mapping of resource sets of an ePRACH/SePRACH to frequency-interlaced resource blocks; an indication of a transport block size for the ePRACH; at least one power control parameter for the ePRACH/SePRACH; or an indication of at least one subframe or symbol available to transmit a request message. In some examples, the resource sets of the ePRACH/SePRACH may also include at least one dedicated resource set.

In some examples, the system information transmission management module 1150 may be used to transmit, an indication of a dedicated resource set of an ePRACH/SePRACH, such as through a SIB or eSIB, for example. The system information may also include an indication of a transport block size for the ePRACH/SePRACH; at least one power control parameter for the ePRACH/SePRACH; or an indication of at least one subframe or symbol available to transmit a request message.

In some examples, the ePRACH/SePRACH request processing module 1135 may be used to receive one or more request messages. Each of the request messages may be received on an ePRACH/SePRACH, from a respective UE, to access a cell that operates in the unlicensed radio frequency spectrum band (e.g., a cell including the apparatus 1105). In some examples, the request message may be an unscheduled request message. In some examples, the request message may be received over the unlicensed radio frequency spectrum band.

In some examples, the channel contention resolution module 1155 may be used to resolve channel contention between a plurality of UEs for which request messages have been received on the ePRACH/SePRACH.

In some examples, the response transmission management module 1140 may be used to transmit, in response to receiving a request message, a response message. The response message may be transmitted over the unlicensed radio frequency spectrum band. When a request message received using the ePRACH/SePRACH request processing module 1135, or using the CET request processing module 1165, includes a connection setup request, the response message transmitted using the response transmission management module 1140 may include a channel contention resolution indication and a connection configuration message. When a request message received using the ePRACH/SePRACH request processing module 1135 includes a connection reestablishment request, the response message transmitted using the response transmission management module 1140 may include a channel contention resolution indication. In some examples, the response message may also include a device identifier or an indication of a timing adjustment.

In some examples, the response transmission management module 1140 may be used to transmit a response message after the CCA module 1145 wins a contention for access to the unlicensed radio frequency spectrum band.

In some examples, the connection setup management module 1160 may be used to manage a connection setup. The connection setup management module 1160 may cause the response transmission management module 1140 to transmit a response message in response to the ePRACH/SePRACH request processing module 1135, or CET request processing module 1165, receiving a connection setup request. The CET request processing module 1165 may be used to receive one or more request messages sent via a CET.

In some examples of the apparatus 1105, the request message may be further configured or received as described with reference to FIGS. 3-7, or the response message may be further configured or transmitted as described with reference to FIGS. 3-7.

Figure 12:
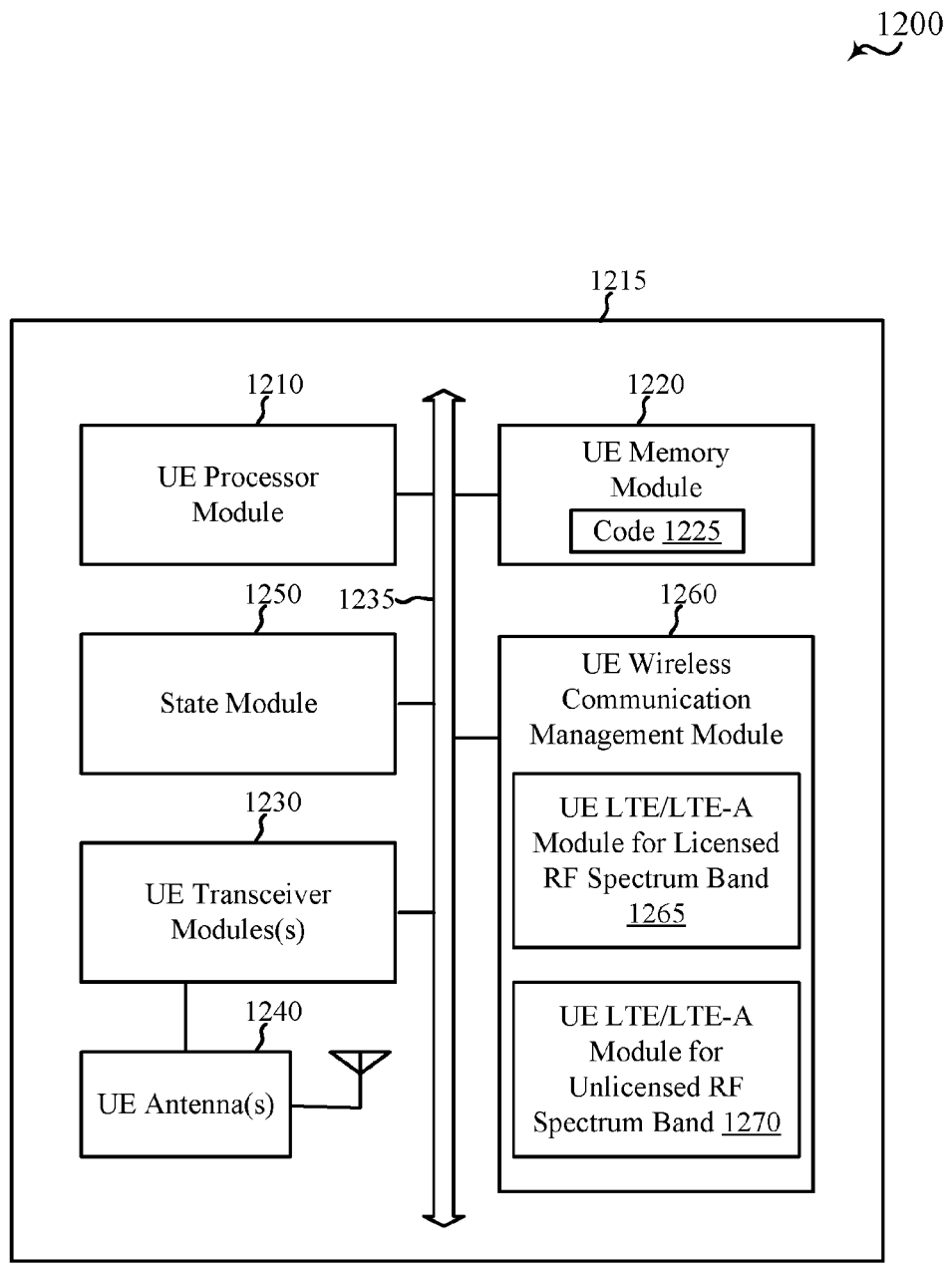
FIG. 12 shows a block diagram of a UE for use in wireless communication, in accordance with various aspects of the present disclosure.

FIG. 12 shows a block diagram 1200 of a UE 1215 for use in wireless communication, in accordance with various aspects of the present disclosure. The UE 1215 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1215 may, in some examples, have an internal power supply (not shown), such as a small battery, to facilitate mobile operation. In some examples, the UE 1215 may be an example of aspects of one or more of the UE 115, 215, 215-*a*, 215-*b*, 215-*c*, 415, 515, or 615 described with reference to FIG. 1, 2, 4, 5, or 6, or aspects of one or more of the apparatuses 815 or 915 described with reference to FIG. 8 or 9. The UE 1215 may be configured to implement at least some of the UE or apparatus features and functions described with reference to FIGS. 1-9.

The UE 1215 may include a UE processor module 1210, a UE memory module 1220, at least one UE transceiver module (represented by UE transceiver module(s) 1230), at least one UE antenna (represented by UE antenna(s) 1240), or a UE wireless communication management module 1260. Each of these components may be in communication with each other, directly or indirectly, over one or more buses 1235.

The UE memory module 1220 may include random access memory (RAM) or read-only memory (ROM). The UE memory module 1220 may store computer-readable, computer-executable code 1225 containing instructions that are configured to, when executed, cause the UE processor module 1210 to perform various functions described herein related to wireless communication, including the transmission of a request message, on an ePRACH, to access a cell that operates in an unlicensed radio frequency spectrum band, and including the reception of a response message over the unlicensed radio frequency spectrum band. Alternatively, the code 1225 may not be directly executable by the UE processor module 1210 but be configured to cause the UE 1215 (e.g., when compiled and executed) to perform various of the functions described herein.

The UE processor module 1210 may include an intelligent hardware device, e.g., a central processing unit (CPU), a microcontroller, an ASIC, etc. The UE processor module 1210 may process information received through the UE transceiver module(s) 1230 or information to be sent to the UE transceiver module(s) 1230 for transmission through the UE antenna(s) 1240. The UE processor module 1210 may handle, alone or in connection with the UE wireless communication management module 1260, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The UE transceiver module(s) 1230 may include a modem configured to modulate packets and provide the modulated packets to the UE antenna(s) 1240 for transmission, and to demodulate packets received from the UE antenna(s) 1240. The UE transceiver module(s) 1230 may, in some examples, be implemented as one or more UE transmitter modules and one or more separate UE receiver modules. The UE transceiver module(s) 1230 may support communications in the licensed radio frequency spectrum band or the unlicensed radio frequency spectrum band. The UE transceiver module(s) 1230 may be configured to communicate bi-directionally, via the UE antenna(s) 1240, with one or more of the base stations 105, 205, 205-*a*, 405, 505, or 605 described with reference to FIG. 1, 2, 4, 5 or 6, or the apparatus 1005 or 1105 described with reference to FIG. 10 or 11. While the UE 1215 may include a single UE antenna, there may be examples in which the UE 1215 may include multiple UE antennas 1240.

The UE state module 1250 may be used, for example, to manage transitions of the UE 1215 between an RRC idle state and an RRC connected state, and may be in communication with other components of the UE 1215, directly or indirectly, over the one or more buses 1235. The UE state module 1250, or portions of it, may include a processor, or some or all of the functions of the UE state module 1250 may be performed by the UE processor module 1210 or in connection with the UE processor module 1210.

The UE wireless communication management module 1260 may be configured to perform or control some or all of the UE or apparatus features or functions described with reference to FIGS. 1-9 related to wireless communication over a licensed radio frequency spectrum band or an unlicensed radio frequency spectrum band. For example, the UE wireless communication management module 1260 may be configured to support a supplemental downlink mode, a carrier aggregation mode, or a standalone mode using the licensed radio frequency spectrum band or the unlicensed radio frequency spectrum band. The UE wireless communication management module 1260 may include a UE LTE/LTE-A module for licensed RF spectrum band 1265 configured to handle LTE/LTE-A communications in the licensed radio frequency spectrum band, and a UE LTE/LTE-A module for unlicensed RF spectrum band 1270 configured to handle LTE/LTE-A communications in the unlicensed radio frequency spectrum band. The UE wireless communication management module 1260, or portions of it, may include a processor, or some or all of the functions of the UE wireless communication management module 1260 may be performed by the UE processor module 1210 or in connection with the UE processor module 1210. In some examples, the UE wireless communication management module 1260 may be an example of the UE wireless communication management module 820 or 920 described with reference to FIG. 8 or 9.

Figure 13:
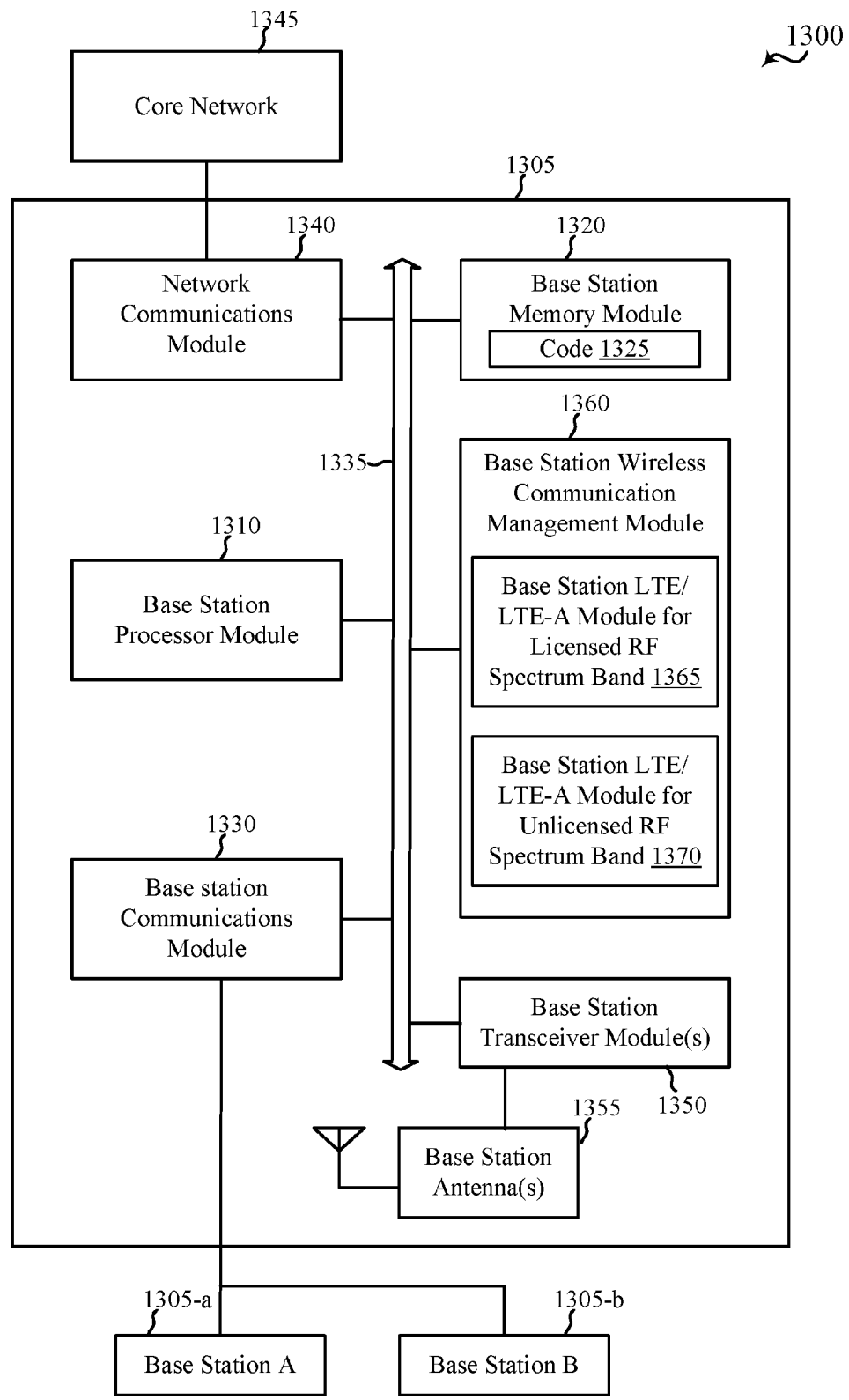
FIG. 13 shows a block diagram of a base station (e.g., a base station forming part or all of an evolved Node B (eNB)) for use in wireless communication, in accordance with various aspects of the present disclosure.

FIG. 13 shows a block diagram 1300 of a base station 1305 (e.g., a base station forming part or all of an eNB) for use in wireless communication, in accordance with various aspects of the present disclosure. In some examples, the base station 1305 may be an example of one or more aspects of the base station 105, 205, 205-*a*, 405, 505, or 605 described with reference to FIG. 1, 2, 4, 5, or 6, or aspects of the apparatus 1005 or 1105 described with reference to FIG. 10 or 11. The base station 1305 may be configured to implement or facilitate at least some of the base station features and functions described with reference to FIG. 1-7 or 10-11.

The base station 1305 may include a base station processor module 1310, a base station memory module 1320, at least one base station transceiver module (represented by base station transceiver module(s) 1350), at least one base station antenna (represented by base station antenna(s) 1355), or a base station wireless communication management module 1360. The base station 1305 may also include one or more of a base station communications module 1330 or a network communications module 1340. Each of these components may be in communication with each other, directly or indirectly, over one or more buses 1335.

The base station memory module 1320 may include RAM or ROM. The base station memory module 1320 may store computer-readable, computer-executable code 1325 containing instructions that are configured to, when executed, cause the base station processor module 1310 to perform various functions described herein related to wireless communication, including the reception of a request message from each of a number of UEs, on an ePRACH/SePRACH, to access a cell that operates in an unlicensed radio frequency spectrum band, and including the transmission of a response message over the unlicensed radio frequency spectrum band. Alternatively, the code 1325 may not be directly executable by the base station processor module 1310 but be configured to cause the base station 1305 (e.g., when compiled and executed) to perform various of the functions described herein.

The base station processor module 1310 may include an intelligent hardware device, e.g., a CPU, a microcontroller, an ASIC, etc. The base station processor module 1310 may process information received through the base station transceiver module(s) 1350, the base station communications module 1330, or the network communications module 1340. The base station processor module 1310 may also process information to be sent to the transceiver module(s) 1350 for transmission through the antenna(s) 1355, to the base station communications module 1330, for transmission to one or more other base stations 1305-*a* and 1305-*b*, or to the network communications module 1340 for transmission to a core network 1345, which may be an example of one or more aspects of the core network 130 described with reference to FIG. 1. The base station processor module 1310 may handle, alone or in connection with the base station wireless communication management module 1360, various aspects of communicating over (or managing communications over) a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The base station transceiver module(s) 1350 may include a modem configured to modulate packets and provide the modulated packets to the base station antenna(s) 1355 for transmission, and to demodulate packets received from the base station antenna(s) 1355. The base station transceiver module(s) 1350 may, in some examples, be implemented as one or more base station transmitter modules and one or more separate base station receiver modules. The base station transceiver module(s) 1350 may support communications in the licensed radio frequency spectrum band or the unlicensed radio frequency spectrum band. The base station transceiver module(s) 1350 may be configured to communicate bi-directionally, via the antenna(s) 1355, with one or more UEs or apparatuses, such as one or more of the UEs 115, 215, 215-*a*, 215-*b*, 215-*c*, 415, 515, 615, or 1215 described with reference to FIG. 1, 2, 4, 5, 6 or 12, or one or more of the apparatuses 815 or 915 described with reference to FIG. 8 or 9. The base station 1305 may, for example, include multiple base station antennas 1355 (e.g., an antenna array). The base station 1305 may communicate with the core network 1345 through the network communications module 1340. The base station 1305 may also communicate with other base stations, such as the base stations 1305-*a* and 1305-*b*, using the base station communications module 1330.

The base station wireless communication management module 1360 may be configured to perform or control some or all of the features or functions described with reference to FIG. 1-7 or 10-11 related to wireless communication over a licensed radio frequency spectrum band or an unlicensed radio frequency spectrum band. For example, the base station wireless communication management module 1360 may be configured to support a supplemental downlink mode, a carrier aggregation mode, or a standalone mode using the licensed radio frequency spectrum band or the unlicensed radio frequency spectrum band. The base station wireless communication management module 1360 may include a base station LTE/LTE-A module for licensed RF spectrum band 1365 configured to handle LTE/LTE-A communications in the licensed radio frequency spectrum band, and a base station LTE/LTE-A module for unlicensed RF spectrum band 1370 configured to handle LTE/LTE-A communications in the unlicensed radio frequency spectrum band. The base station wireless communication management module 1360, or portions of it, may include a processor, or some or all of the functions of the base station wireless communication management module 1360 may be performed by the base station processor module 1310 or in connection with the base station processor module 1310. In some examples, the base station wireless communication management module 1360 may be an example of the base station wireless communication management module 1020 or 1120 described with reference to FIG. 10 or 11.

Figure 14:
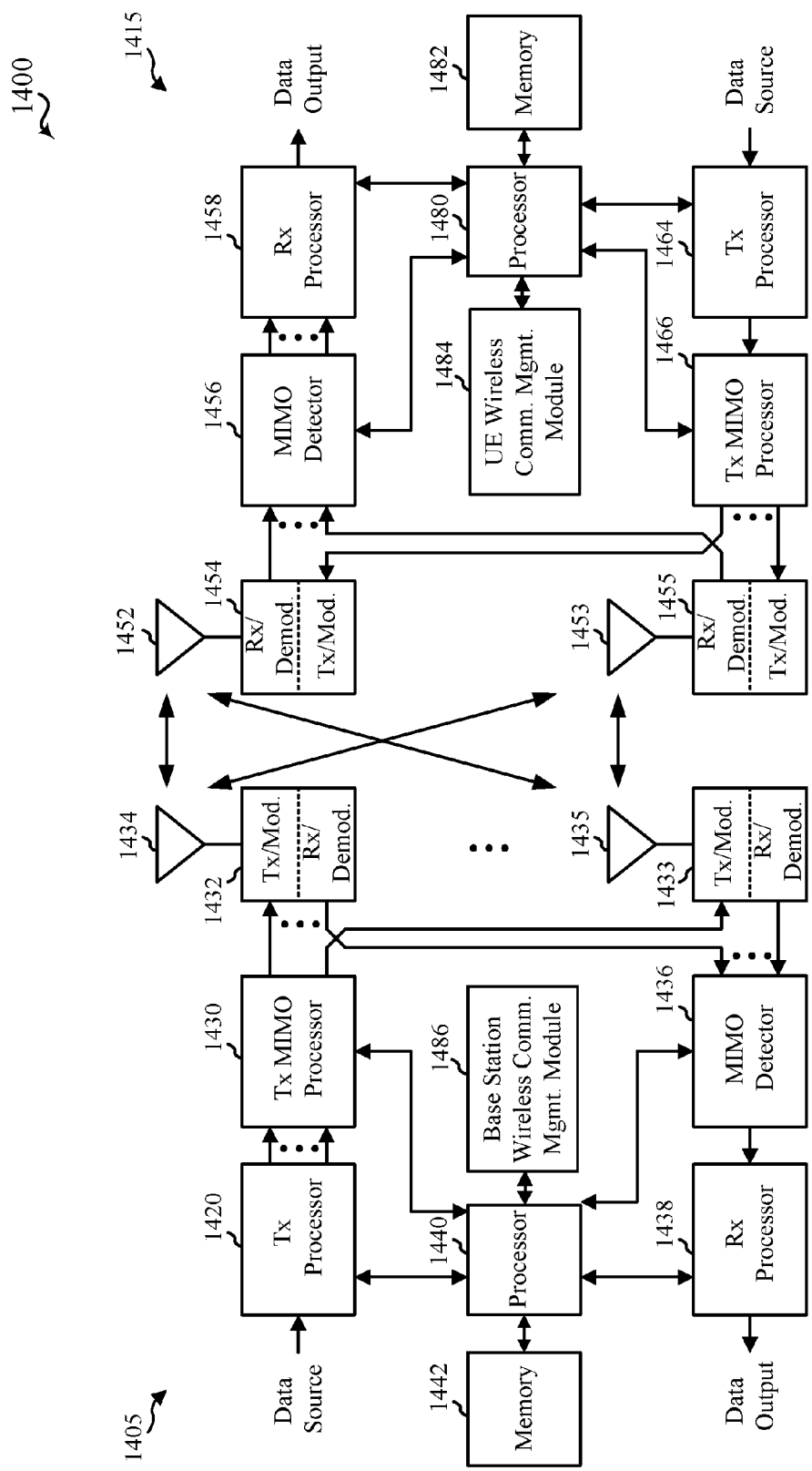
FIG. 14 is a block diagram of a multiple input/multiple output (MIMO) communication system including a base station and a UE, in accordance with various aspects of the present disclosure.

FIG. 14 is a block diagram of a multiple input/multiple output (MIMO) communication system 1400 including a base station 1405 and a UE 1415, in accordance with various aspects of the present disclosure. The MIMO communication system 1400 may illustrate aspects of the wireless communication system 100 or 200 described with reference to FIG. 1 or 2. The base station 1405 may be an example of aspects of the base station 105, 205, 205-*a*, 405, 505, 605, or 1305 described with reference to FIG. 1, 2, 4, 5, 6, or 13, or aspects of the apparatus 1005 or 1105 described with reference to FIG. 10 or 11. The base station 1405 may be equipped with antennas 1434 through 1435, and the UE 1415 may be equipped with antennas 1452 through 1453. In the MIMO communication system 1400, the base station 1405 may be able to send data over multiple communication links at the same time. Each communication link may be called a "layer" and the "rank" of the communication link may indicate the number of layers used for communication. For example, in a 2×2 MIMO communications system where base station 1405 transmits two "layers," the rank of the communication link between the base station 1405 and the UE 1415 is two.

At the base station 1405, a transmit processor 1420 may receive data from a data source. The transmit processor 1420 may process the data. The transmit processor 1420 may also generate control symbols or reference symbols. A transmit (TX) MIMO processor 1430 may perform spatial processing (e.g., precoding) on data symbols, control symbols, or reference symbols, if applicable, and may provide output symbol streams to the transmit modulators 1432 through 1433. Each modulator 1432 through 1433 may process a respective output symbol stream (e.g., for OFDM, etc.) to obtain an output sample stream. Each modulator 1432 through 1433 may further process (e.g., convert to analog, amplify, filter, and upconvert) the output sample stream to obtain a DL signal. In one example, DL signals from modulators 1432 through 1433 may be transmitted via the antennas 1434 through 1435, respectively.

The UE 1415 may be an example of aspects of the UE 115, 215, 215-*a*, 215-*b*, 215-*c*, 415, 515, 615, or 1215 described with reference to FIG. 1, 2, 4, 5, 6, or 12, or aspects of the apparatus 815 or 915 described with reference to FIG. 8 or 9. At the UE 1415, the UE antennas 1452 through 1453 may receive the DL signals from the base station 1405 and may provide the received signals to the demodulators 1454 through 1455, respectively. Each demodulator 1454 through 1455 may condition (e.g., filter, amplify, downconvert, and digitize) a respective received signal to obtain input samples. Each demodulator 1454 through 1455 may further process the input samples (e.g., for OFDM, etc.) to obtain received symbols. A MIMO detector 1456 may obtain received symbols from all the demodulators 1454 through 1455, perform MIMO detection on the received symbols, if applicable, and provide detected symbols. A receive processor 1458 may process (e.g., demodulate, deinterleave, and decode) the detected symbols, providing decoded data for the UE 1415 to a data output, and provide decoded control information to a processor 1480, or memory 1482.

The processor 1480 may in some cases execute stored instructions to instantiate a UE wireless communication management module 1484. The UE wireless communication management module 1484 may be an example of aspects of the UE wireless communication management module 820, 920, or 1260 described with reference to FIG. 8, 9, or 12.

On the uplink, at the UE 1415, a transmit processor 1464 may receive and process data from a data source. The transmit processor 1464 may also generate reference symbols for a reference signal. The symbols from the transmit processor 1464 may be precoded by a transmit MIMO processor 1466 if applicable, further processed by the modulators 1454 through 1455 (e.g., for SC-FDMA, etc.), and be transmitted to the base station 1405 in accordance with the transmission parameters received from the base station 1405. At the base station 1405, the UL signals from the UE 1415 may be received by the antennas 1434 through 1435, processed by the demodulators 1432 through 1433, detected by a MIMO detector 1436 if applicable, and further processed by a receive processor 1438. The receive processor 1438 may provide decoded data to a data output and to the processor 1440 or memory 1442.

The processor 1440 may in some cases execute stored instructions to instantiate a base station wireless communication management module 1486. The base station wireless communication management module 1486 may be an example of aspects of the base station wireless communication management module 1020, 1120, or 1360 described with reference to FIG. 10, 11, or 13.

The components of the UE 1415 may, individually or collectively, be implemented with one or more ASICs adapted to perform some or all of the applicable functions in hardware. Each of the noted modules may be a means for performing one or more functions related to operation of the MIMO communication system 1400. Similarly, the components of the base station 1405 may, individually or collectively, be implemented with one or more ASICs adapted to perform some or all of the applicable functions in hardware. Each of the noted components may be a means for performing one or more functions related to operation of the MIMO communication system 1400.

Figure 15:
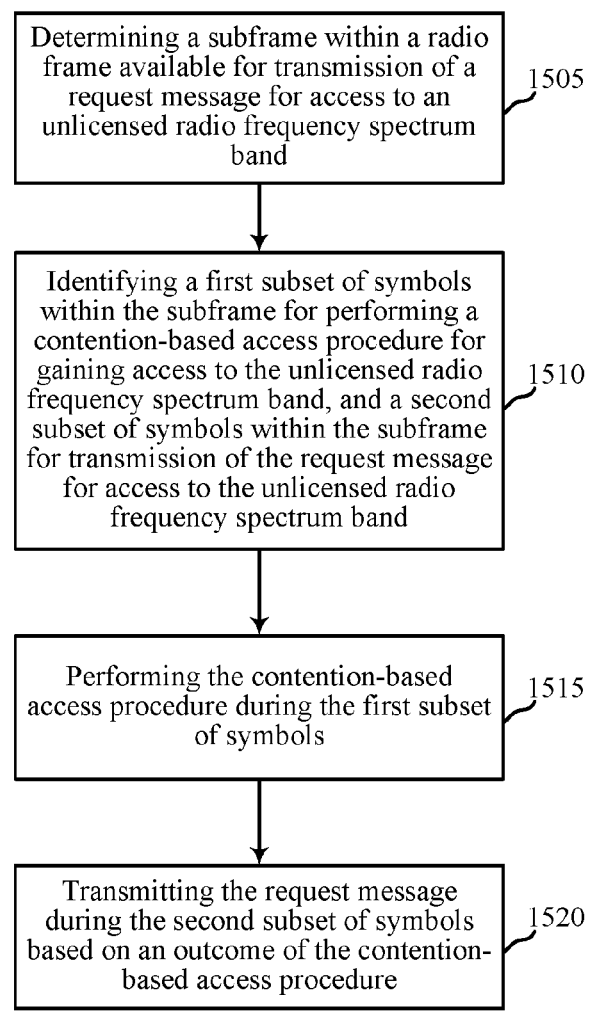
FIG. 15 is a flow chart illustrating an exemplary method for wireless communication, in accordance with various aspects of the present disclosure.

FIG. 15 is a flow chart illustrating an exemplary of a method 1500 for wireless communication, in accordance with various aspects of the present disclosure. For clarity, the method 1500 is described below with reference to aspects of one or more of the UEs 115, 215, 215-*a*, 215-*b*, 215-*c*, 415, 515, 615, 1315 or 1415 described with reference to FIG. 1, 2, 4, 5, 6, 13, or 14, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may include determining a subframe within a radio frame available for transmission of a request message for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 1505 may be performed using the UE wireless communication management module 820, 920, 1260, or 1484 described with reference to FIG. 8, 9, 12, or 14, or the ePRACH/SePRACH request transmission management module 835 or 935 described with reference to FIG. 8 or 9.

At block 1510, the method 1500 may include identifying a first subset of symbols within the subframe for performing a contention-based access procedure for gaining access to the unlicensed radio frequency spectrum band, and a second subset of symbols within the subframe for transmission of the request message for access to the unlicensed radio frequency spectrum band. The operation(s) at block 1510 may be performed using the UE wireless communication management module 820, 920, 1260, or 1484 described with reference to FIG. 8, 9, 12, or 14, or the ePRACH/SePRACH request transmission management module 835 or 935 described with reference to FIG. 8 or 9.

At block 1515, the method 1500 may include performing the contention-based access procedure during the first subset of symbols. The operation(s) at block 1515 may be performed using the UE wireless communication management module 820, 920, 1260, or 1484 described with reference to FIG. 8, 9, 12, or 14, or the CCA module 945 of FIG. 9.

At block 1520, the method 1500 may include transmitting the request message during the second subset of symbols based on an outcome of the contention-based access procedure. The operation(s) at block 1520 may be performed using the UE wireless communication management module 820, 920, 1260, or 1484 described with reference to FIG. 8, 9, 12, or 14, or the ePRACH/SePRACH request transmission management module 835 or 935 of FIG. 8 or 9.

In some examples of the method 1500, the request message may be further configured or transmitted as described with reference to FIGS. 3-7, or the response message may be further configured or received as described with reference to FIGS. 3-7.

Thus, the method 1500 may provide for wireless communication. It should be noted that the method 1500 is just one implementation and that the operations of the method 1500 may be rearranged or otherwise modified such that other implementations are possible.

Figure 16:
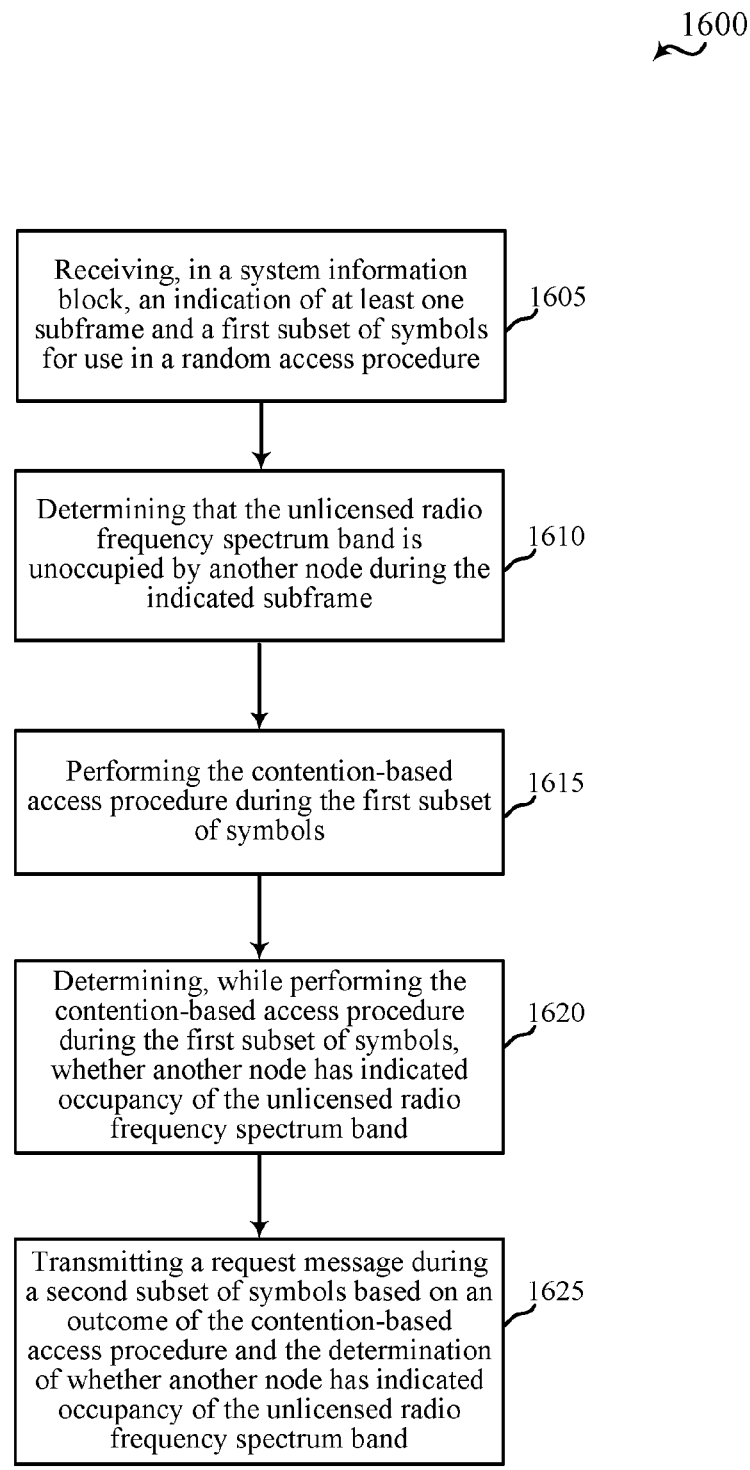
FIG. 16 is a flow chart illustrating an exemplary method for wireless communication, in accordance with various aspects of the present disclosure.

FIG. 16 is a flow chart illustrating an exemplary of a method 1600 for wireless communication, in accordance with various aspects of the present disclosure. For clarity, the method 1600 is described below with reference to aspects of one or more of the UEs 115, 215, 215-a, 215-b, 215-c, 415, 515, 615, 1315 or 1415 described with reference to FIG. 1, 2, 4, 5, 6, 13, or 14, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1605, the method 1600 may include receiving, in a system information block, an indication of at least one subframe and a first subset of symbols for use in a random access procedure. The operation(s) at block 1605 may be performed using the UE wireless communication management module 820, 920, 1260, or 1484 described with reference to FIG. 8, 9, 12, or 14, or the system information processing module 950 described with reference to FIG. 9.

At block 1610, the method 1600 may include determining that the unlicensed radio frequency spectrum band is unoccupied by another node during the indicated subframe. The operation(s) at block 1610 may be performed using the UE wireless communication management module 820, 920, 1260, or 1484 described with reference to FIG. 8, 9, 12, or 14, or the ePRACH/SePRACH request transmission management module 835 or 935 described with reference to FIG. 8 or 9.

At block 1615, the method 1600 may include performing the contention-based access procedure during the first subset of symbols. The operation(s) at block 1615 may be performed using the UE wireless communication management module 820, 920, 1260, or 1484 described with reference to FIG. 8, 9, 12, or 14, or the CCA module 945 of FIG. 9.

At block 1620, the method 1600 may include determining, while performing the contention-based access procedure during the first subset of symbols, whether another node has indicated occupancy of the unlicensed radio frequency spectrum band. The operation(s) at block 1620 may be performed using the UE wireless communication management module 820, 920, 1260, or 1484 described with reference to FIG. 8, 9, 12, or 14, or the ePRACH/SePRACH request transmission management module 835 or 935 of FIG. 8 or 9.

At block 1625, the method 1600 may include transmitting a request message during a second subset of symbols based on an outcome of the contention-based access procedure and the determination of whether another node has indicated occupancy of the unlicensed radio frequency spectrum band. The operation(s) at block 1625 may be performed using the UE wireless communication management module 820, 920, 1260, or 1484 described with reference to FIG. 8, 9, 12, or 14, or the ePRACH/SePRACH request transmission management module 835 or 935 of FIG. 8 or 9.

In some examples of the method 1600, the request message may be further configured or transmitted as described with reference to FIGS. 3-7, or the response message may be further configured or received as described with reference to FIGS. 3-7.

Thus, the method 1600 may provide for wireless communication. It should be noted that the method 1600 is just one implementation and that the operations of the method 1600 may be rearranged or otherwise modified such that other implementations are possible.

Figure 17:
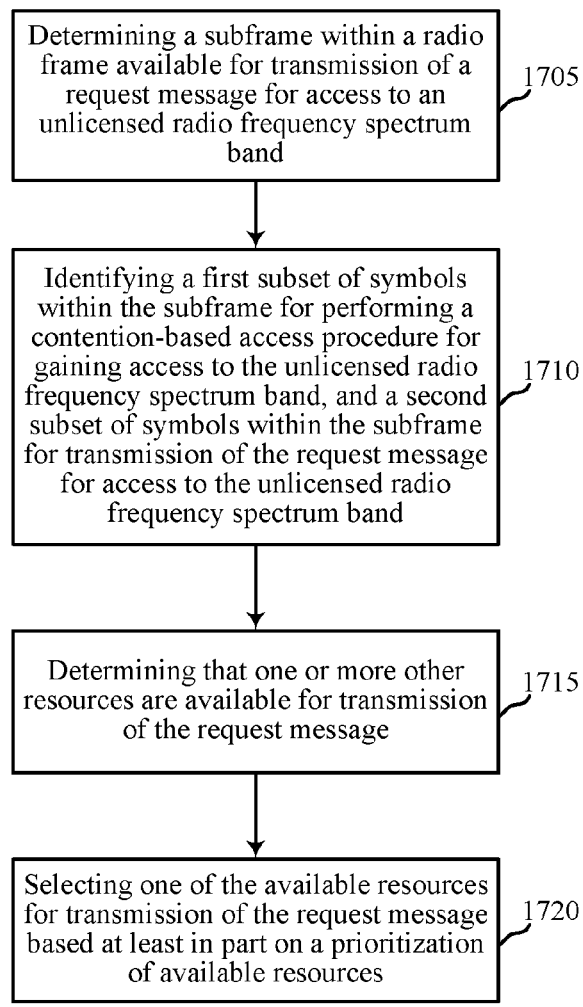
FIG. 17 is a flow chart illustrating an exemplary method for wireless communication, in accordance with various aspects of the present disclosure.

FIG. 17 is a flow chart illustrating an exemplary of a method 1700 for wireless communication, in accordance with various aspects of the present disclosure. For clarity, the method 1700 is described below with reference to aspects of one or more of the UEs 115, 215, 215-a, 215-b, 215-c, 415, 515, 615, 1315 or 1415 described with reference to FIG. 1, 2, 4, 5, 6, 13, or 14, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1705, the method 1700 may include determining a subframe within a radio frame available for transmission of a request message for access to an unlicensed radio frequency spectrum band. The operation(s) at block 1705 may be performed using the UE wireless communication management module 820, 920, 1260, or 1484 described with reference to FIG. 8, 9, 12, or 14, or the system information processing module 950 described with reference to FIG. 9.

At block 1710, the method 1700 may include identifying a first subset of symbols within the subframe for performing a contention-based access procedure for gaining access to the unlicensed radio frequency spectrum band, and a second subset of symbols within the subframe for transmission of the request message for access to the unlicensed radio frequency spectrum band. The operation(s) at block 1710 may be performed using the UE wireless communication management module 820, 920, 1260, or 1484 described with reference to FIG. 8, 9, 12, or 14, or the ePRACH/SePRACH request transmission management module 835 or 935 described with reference to FIG. 8 or 9.

At block 1715, the method 1700 may include determining that one or more other resources are available for transmission of the request message. The operation(s) at block 1715 may be performed using the UE wireless communication management module 820, 920, 1260, or 1484 described with reference to FIG. 8, 9, 12, or 14, or the ePRACH/SePRACH request transmission management module 835 or 935 described with reference to FIG. 8 or 9.

At block 1720, the method 1700 may include selecting one of the available resources for transmission of the request message based at least in part on a prioritization of available resources. The operation(s) at block 1720 may be performed using the UE wireless communication management module 820, 920, 1260, or 1484 described with reference to FIG. 8, 9, 12, or 14, or the ePRACH/SePRACH request transmission management module 835 or 935 of FIG. 8 or 9.

In some examples of the method 1700, the request message may be further configured or transmitted as described with reference to FIGS. 3-7, or the response message may be further configured or received as described with reference to FIGS. 3-7.

Thus, the method 1700 may provide for wireless communication. It should be noted that the method 1700 is just one implementation and that the operations of the method 1700 may be rearranged or otherwise modified such that other implementations are possible.

Figure 18:
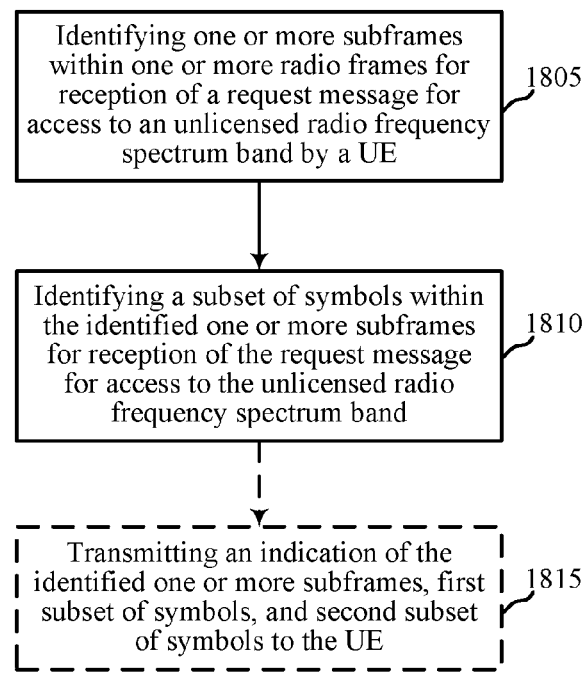
FIG. 18 is a flow chart illustrating an exemplary method for wireless communication, in accordance with various aspects of the present disclosure.

FIG. 18 is a flow chart illustrating an exemplary method 1800 for wireless communication, in accordance with various aspects of the present disclosure. For clarity, the method 1800 is described below with reference to aspects of one or more of the base stations 105, 205, 205-*a*, 205-*b*, 205-*c*, 405, 505, 605, 1305, or 1405 described with reference to FIG. 1, 2, 4, 5, 6, 13, or 14, or aspects of one or more of the apparatuses 1005 or 1105 described with reference to FIG. 11 or 12. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1805, the method 1800 may include identifying one or more subframes within one or more radio frames for reception of a request message for access to an unlicensed radio frequency spectrum band by a UE. The operation(s) at block 1805 may be performed using the base station wireless communication management module 1020, 1120, 1360, or 1486 described with reference to FIG. 10, 11, 13, or 14, or the system information processing module 1250 or system information transmission management module 1150 described with reference to FIG. 11.

At block 1810, the method 1800 may include identifying a subset of symbols within the identified one or more subframes for reception of the request message for access to the unlicensed radio frequency spectrum band. The operation(s) at block 1810 may be performed using the base station wireless communication management module 1020, 1120, 1360, or 1486 described with reference to FIG. 10, 11, 13, or 14, or the base station ePRACH/SePRACH request transmission management module 1035 or 1135 described with reference to FIG. 10 or 11.

At optional block 1815, the method 1800 may include transmitting an indication of the identified one or more subframes, first subset of symbols, and second subset of symbols to the UE. The operation(s) at block 1815 may be performed using the base station wireless communication management module 1020, 1120, 1360, or 1486 described with reference to FIG. 10, 11 13, or 14, or the system information transmission management module 1150 described with reference to FIG. 11.

In some examples, the method 1800 may include repeating the transmitting at block 1820 before receiving the response message at block 1830.

In some examples, the method 1800 may be performed without winning contention for access to the unlicensed radio frequency spectrum band at block 1810. In these examples, the request message may be transmitted during a preconfigured UL CET occasion.

In some examples of the method 1800, the request message may be further configured or transmitted as described with reference to FIG. 5, 7, or 11, or the response message may be further configured or received as described with reference to FIG. 5, 7, or 11.

Thus, the method 1800 may provide for wireless communication. It should be noted that the method 1800 is just one implementation and that the operations of the method 1800 may be rearranged or otherwise modified such that other implementations are possible.

Figure 19:
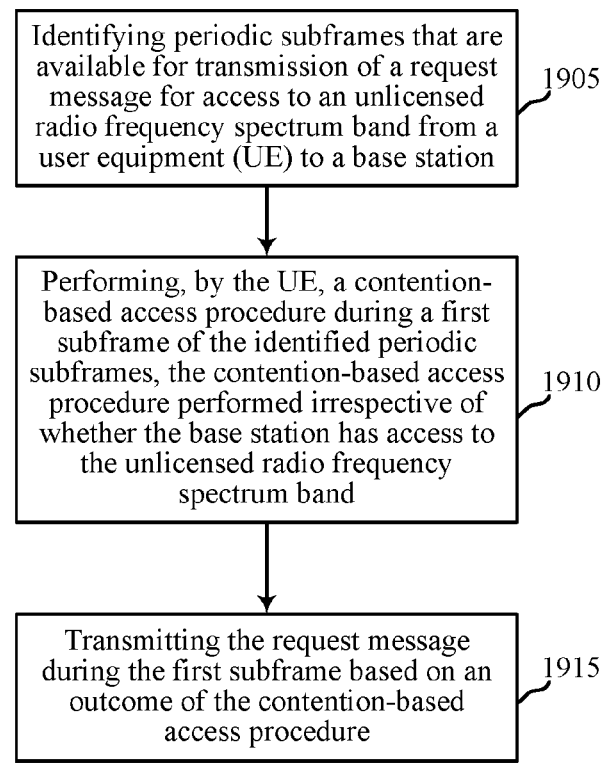
FIG. 19 is a flow chart illustrating an exemplary of a method for wireless communication, in accordance with various aspects of the present disclosure.

FIG. 19 is a flow chart illustrating an exemplary of a method 1900 for wireless communication, in accordance with various aspects of the present disclosure. For clarity, the method 1900 is described below with reference to aspects of one or more of the UEs 115, 215, 215-*a*, 215-*b*, 215-*c*, 415, 515, 615, 1315 or 1415 described with reference to FIG. 1, 2, 4, 5, 6, 13, or 14, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1905, the method 1900 may include determining identifying periodic subframes that are available for transmission of a request message for access to an unlicensed radio frequency spectrum band from a UE to a base station. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 1905 may be performed using the UE wireless communication management module 820, 920, 1260, or 1484 described with reference to FIG. 8, 9, 12, or 14, or the ePRACH/SePRACH request transmission management module 835 or 935 described with reference to FIG. 8 or 9.

At block 1910, the method 1900 may include performing, by the UE, a contention-based access procedure during a first subframe of the identified periodic subframes, the contention-based access procedure performed irrespective of whether the base station has access to the unlicensed radio frequency spectrum band. The operation(s) at block 1910 may be performed using the UE wireless communication management module 820, 920, 1260, or 1484 described with reference to FIG. 8, 9, 12, or 14, or the CCA module 945 of FIG. 9.

At block 1920, the method 1900 may include transmitting the request message during the first subframe based on an outcome of the contention-based access procedure. The operation(s) at block 1920 may be performed using the UE wireless communication management module 820, 920, 1260, or 1484 described with reference to FIG. 8, 9, 12, or 14, or the ePRACH/SePRACH request transmission management module 835 or 935 of FIG. 8 or 9.

In some examples of the method 1900, the request message may be further configured or transmitted as described with reference to FIGS. 3-7, or the response message may be further configured or received as described with reference to FIGS. 3-7.

Thus, the method 1900 may provide for wireless communication. It should be noted that the method 1900 is just one implementation and that the operations of the method 1900 may be rearranged or otherwise modified such that other implementations are possible.

Figure 20:
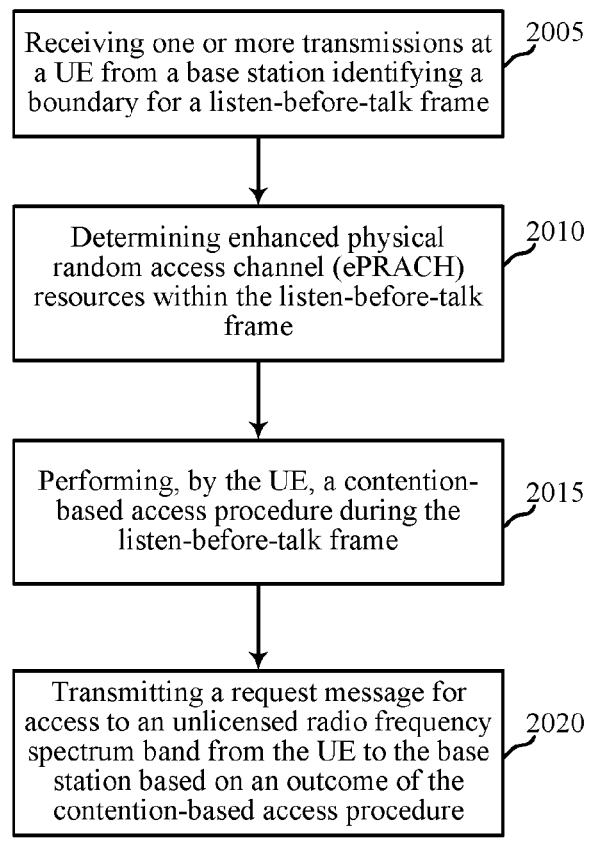
FIG. 20 is a flow chart illustrating an exemplary method for wireless communication, in accordance with various aspects of the present disclosure.

FIG. 20 is a flow chart illustrating an exemplary of a method 2000 for wireless communication, in accordance with various aspects of the present disclosure. For clarity, the method 2000 is described below with reference to aspects of one or more of the UEs 115, 215, 215-*a*, 215-*b*, 215-*c*, 415, 515, 615, 1315 or 1415 described with reference to FIG. 1, 2, 4, 5, 6, 13, or 14, or aspects of one or more of the apparatuses 815 or 915 described with reference to FIG. 8 or 9. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2005, the method 2000 may include receiving one or more transmissions at a UE from a base station identifying a boundary for an LBT frame. The operation(s) at block 2005 may be performed using the UE wireless communication management module 820, 920, 1260, or 1484 described with reference to FIG. 8, 9, 12, or 14, or the system information processing module 950 described with reference to FIG. 9.

At block 2010, the method 2000 may include determining ePRACH resources within the listen-before-talk frame. The operation(s) at block 2010 may be performed using the UE wireless communication management module 820, 920, 1260, or 1484 described with reference to FIG. 8, 9, 12, or 14, or the ePRACH/SePRACH request transmission management module 835 or 935 described with reference to FIG. 8 or 9.

At block 2015, the method 2000 may include performing, by the UE, a contention-based access procedure during the listen-before-talk frame. The operation(s) at block 2015 may be performed using the UE wireless communication management module 820, 920, 1260, or 1484 described with reference to FIG. 8, 9, 12, or 14, or the CCA module 945 of FIG. 9.

At block 2020, the method 2000 may include transmitting a request message for access to an unlicensed radio frequency spectrum band from the UE to the base station based on an outcome of the contention-based access procedure. The operation(s) at block 2020 may be performed using the UE wireless communication management module 820, 920, 1260, or 1484 described with reference to FIG. 8, 9, 12, or 14, or the ePRACH/SePRACH request transmission management module 835 or 935 of FIG. 8 or 9.

In some examples of the method 2000, the request message may be further configured or transmitted as described with reference to FIGS. 3-7, or the response message may be further configured or received as described with reference to FIGS. 3-7.

Thus, the method 2000 may provide for wireless communication. It should be noted that the method 2000 is just one implementation and that the operations of the method 2000 may be rearranged or otherwise modified such that other implementations are possible.

Techniques described herein may be used for various wireless communications systems such as code-division multiple access (CDMA) systems, time-division multiple access (TDMA), FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from the 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication comprising:
   receiving, by a user equipment (UE), a channel occupancy signal prior to a start of a subframe within a radio frame;
   determining that the subframe is a candidate for a contention-based access procedure and transmission of a request message for access to an unlicensed radio frequency spectrum band based at least in part on reception of the channel occupancy signal;
   identifying a first subset of symbols within the subframe for performing the contention-based access procedure for gaining access to the unlicensed radio frequency spectrum band and a second subset of symbols within the subframe for transmission of the request message for access to the unlicensed radio frequency spectrum band, wherein the first subset of symbols is identified based at least in part on a hardware delay or software delay for detecting the channel occupancy signal and a first subframe boundary of the subframe within the radio frame;
   performing the contention-based access procedure during the first subset of symbols; and
   transmitting the request message during the second subset of symbols based at least in part on an outcome of the contention-based access procedure.

2. The method of claim 1, wherein transmitting the request message comprises:
   transmitting the request message on an enhanced physical random access channel (ePRACH) over the unlicensed radio frequency spectrum band to access a cell that operates in the unlicensed radio frequency spectrum band.

3. The method of claim 1, wherein the second subset of symbols is identified based at least in part on the first subset of symbols, an identified symbol within the subframe for transmission of the channel occupancy signal, or a transmit-to-receive switching delay.

4. The method of claim 1, wherein the request message comprises a first symbol and a second symbol, the first symbol comprising a demodulation reference signal (DMRS) and the second symbol comprising data associated with the request message.

5. The method of claim 4, wherein the request message is multiplexed with one or more other nodes through a DMRS shift for the first symbol and data interlacing for the second symbol.

6. The method of claim 1, wherein the transmission of the request message is unaligned with a second subframe boundary of the subframe and aligned with a symbol boundary.

7. The method of claim 1, further comprising:
receiving, in a system information block (SIB), an indication of at least one of the subframe, the first subset of symbols, or the second subset of symbols.

8. The method of claim 1, further comprising:
determining available resources for transmission of the request message; and
selecting resources of the available resources for transmission of the request message based at least in part on a prioritization of the available resources.

9. The method of claim 8, wherein the prioritization of available resources for transmission of the request message is based at least in part on a prioritization of resources received in a system information block (SIB) or a biased random selection of available resources.

10. The method of claim 9, wherein the request message is an unscheduled request message.

11. An apparatus for wireless communications at a wireless device, comprising:
a processor; and memory coupled with the processor, wherein the processor is configured to:
receive, by a user equipment (UE), a channel occupancy signal prior to a start of a subframe within a radio frame;
determine that the subframe is a candidate for a contention-based access procedure and transmission of a request message for access to an unlicensed radio frequency spectrum band based at least in part on reception of the channel occupancy signal;
identify a first subset of symbols within the subframe for performing the contention-based access procedure for gaining access to the unlicensed radio frequency spectrum band and a second subset of symbols within the subframe for transmission of the request message for access to the unlicensed radio frequency spectrum band, wherein the first subset of symbols is identified based at least in part on a hardware delay or software delay for detecting the channel occupancy signal and a first subframe boundary of the subframe within the radio frame;
perform the contention-based access procedure during the first subset of symbols; and
transmit the request message during the second subset of symbols based at least in part on an outcome of the contention-based access procedure.

12. The apparatus of claim 11, wherein the processor is further configured to:
transmit the request message on an enhanced physical random access channel (ePRACH) over the unlicensed radio frequency spectrum band to access a cell that operates in the unlicensed radio frequency spectrum band.

13. The apparatus of claim 11, wherein the second subset of symbols is identified based at least in part on the first subset of symbols, an identified symbol within the subframe for transmission of the channel occupancy signal, or a transmit-to-receive switching delay.

14. The apparatus of claim 11, wherein the request message comprises a first symbol and a second symbol, the first symbol comprising a demodulation reference signal (DMRS) and the second symbol comprising data associated with the request message.

15. The apparatus of claim 14, wherein the request message is multiplexed with one or more other nodes through a DMRS shift for the first symbol and data interlacing for the second symbol.

16. The apparatus of claim 11, wherein the transmission of the request message is unaligned with a second subframe boundary of the subframe and aligned with a symbol boundary.

17. The apparatus of claim 11, wherein the processor is further configured to:
receive, in a system information block (SIB), an indication of at least one of the subframe, the first subset of symbols, or the second subset of symbols.

18. The apparatus of claim 11, wherein the processor is further configured to:
determine available resources for transmission of the request message; and
select resources of the available resources for transmission of the request message based at least in part on a prioritization of the available resources.

19. The apparatus of claim 18, wherein the prioritization of available resources for transmission of the request message is based at least in part on a prioritization of resources received in a system information block (SIB) or a biased random selection of available resources.

20. The apparatus of claim 19, wherein the request message is an unscheduled request message.

* * * * *